United States Patent
Igarashi et al.

(10) Patent No.: US 8,232,013 B2
(45) Date of Patent: Jul. 31, 2012

(54) FUEL CELL SYSTEM AND METHOD FOR CONTROLLING FUEL CELL SYSTEM

(75) Inventors: Hitoshi Igarashi, Yokohama (JP); Kenichi Goto, Ayase (JP); Kenji Yonekura, Yokohama (JP); Kazuo Saito, Yokohama (JP); Takashi Iimori, Tokyo (JP); Ryoichi Shimoi, Yokohama (JP); Yohei Kaneko, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 352 days.

(21) Appl. No.: 12/670,037

(22) PCT Filed: Jul. 29, 2008

(86) PCT No.: PCT/IB2008/001972
§ 371 (c)(1),
(2), (4) Date: Jan. 21, 2010

(87) PCT Pub. No.: WO2009/016467
PCT Pub. Date: Feb. 5, 2009

(65) Prior Publication Data
US 2010/0196771 A1    Aug. 5, 2010

(30) Foreign Application Priority Data
Jul. 30, 2007    (JP) ................................. 2007-197728

(51) Int. Cl.
*H01M 8/04* (2006.01)
*H01M 8/24* (2006.01)
*B60K 1/00* (2006.01)

(52) U.S. Cl. ........ 429/428; 429/444; 429/455; 180/65.1
(58) Field of Classification Search .................. 429/428, 429/433, 411, 443, 423, 457, 482, 455, 444; 707/4; 180/65.1
See application file for complete search history.

(56) References Cited

U.S. PATENT DOCUMENTS

| 6,793,027 B1 * | 9/2004 | Yamada et al. ............. 180/65.1 |
| 2003/0167265 A1 * | 9/2003 | Corynen ............................ 707/4 |
| 2005/0019621 A1 * | 1/2005 | Ikuma et al. .................... 429/12 |
| 2005/0244686 A1 | 11/2005 | Kamihara |
| 2007/0054165 A1 | 3/2007 | Yoshida et al. |

FOREIGN PATENT DOCUMENTS

| JP | 2003-109627 | 4/2003 |
| JP | 2004-185974 A | 7/2004 |
| JP | 2005-026054 A | 1/2005 |
| JP | 2006-040718 | 2/2006 |
| JP | 2007-012532 | 1/2007 |
| WO | 2006/120874 A1 | 11/2006 |

* cited by examiner

*Primary Examiner* — Jonathan Crepeau
*Assistant Examiner* — Kenneth Douyette
(74) *Attorney, Agent, or Firm* — Young Basile

(57) ABSTRACT

A fuel cell system has a purge valve that adjusts the amount of nitrogen in a hydrogen circulation channel and a fuel electrode to be discharged through a discharge channel. A purge rate correcting unit variably sets a target control value of the nitrogen content in the hydrogen circulation channel and the fuel electrode by taking into account whether a driving mode is set in a normal power generation mode or an idle mode. An opening of the purge valve is controlled on the basis of the target control value.

15 Claims, 14 Drawing Sheets

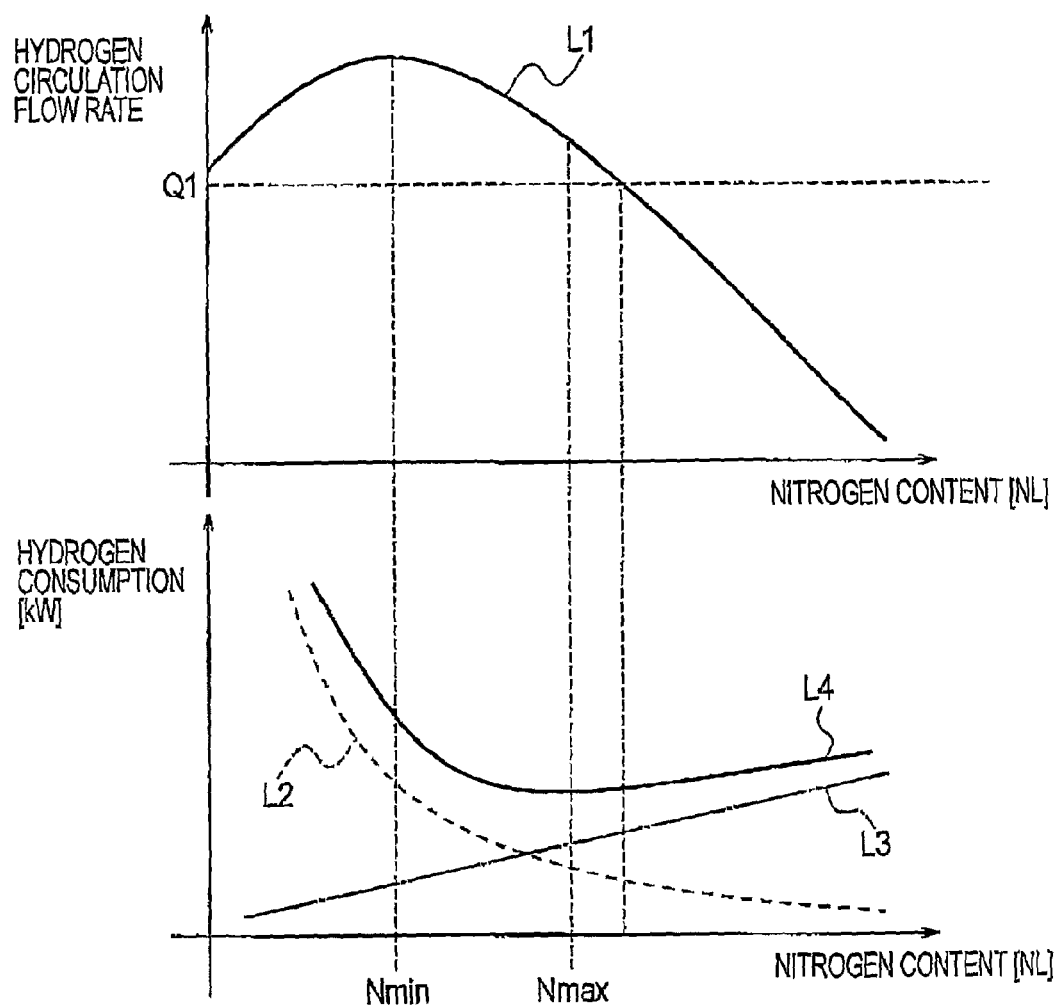

FUEL CELL SYSTEM AND METHOD FOR CONTROLLING FUEL CELL SYSTEM

CROSS-REFERENCE TO RELATED APPLICATION

This application claims priority from Japanese Patent Application Serial No. 2007-197728, filed Jul. 30, 2007, which is incorporated by reference herein in its entirety.

TECHNICAL FIELD

The present invention relates to a fuel cell system and a method for controlling the fuel cell system.

BACKGROUND

Known fuel cell systems include fuel cells that generate power by electrochemically reacting a fuel gas (e.g., hydrogen) supplied to a fuel electrode and an oxidizer gas (e.g., air) supplied to an oxidizer electrode. In order to improve the fuel efficiency, some fuel cells are configured so that excess fuel gas discharged from the fuel electrode is circulated back to the fuel gas supply side through a circulation channel. When air is used as an oxidizer gas, impurities (e.g., nitrogen) in the air permeate from the oxidizer electrode to the fuel electrode. As a result, the impurity concentration in the circulation channel and the fuel electrode tends to increase and the hydrogen partial pressure tends to decrease over time. In this regard, waste gas (i.e., gas containing impurities such as nitrogen, unused hydrogen, and the like) released from the fuel electrode is often discharged out of the fuel cell system through a waste discharge channel connected to the circulation channel by opening and closing a purge valve installed in the waste discharge channel so as to control the amount of impurities.

Such a fuel cell system can be installed on a movable object (e.g., a vehicle). The system supplies electric power generated by the fuel cells to motors for driving the moveable object and for operating auxiliary machineries. Moreover, a secondary battery that compensates for a deficiency of power from the fuel cells can also be incorporated in the fuel cell system.

This type of fuel cell system is usually operated in a power-generating mode in which required power is supplied by the fuel cells. However, if certain switching conditions are satisfied, power generation in the fuel cells is stopped and the system is operated in an idle mode in which the required power is supplied from an energy storing unit to improve the fuel efficiency. In addition to the switching condition, the determination as to whether the system should be switched from the power generation mode to the idle mode includes consideration of whether the performance of the fuel cells that would be stopped if the system is switched to the idle mode will be degraded when the fuel cells are re-started. If the system determines that degradation in performance will occur, the fuel cells are controlled to generate power even when the idle mode would be selected on the basis of the switching conditions. To determine whether degradation in performance will occur, the impurity concentration in the gas supplied to the fuel cells is typically used as the criterion, i.e., the system determines that degradation in performance of fuel cells will occur upon re-start if the impurity concentration is at a predetermined value or higher. For example, Japanese Unexamined Patent Application Publication No. 2005-26054 discloses a fuel cell system of this type.

BRIEF SUMMARY

In an embodiment of the invention, the impurity content in the circulation channel and the fuel electrode can be controlled by taking into account the driving mode. Thus, compared to when the impurity content is controlled without considering the driving mode, the impurity content can be more effectively controlled in all driving modes. Thus, degradation in fuel efficiency under the normal power generation mode can be suppressed while improving the fuel efficiency under the idle mode.

Details of this and other embodiments of the invention are described in additional detail herein.

BRIEF DESCRIPTION OF THE DRAWINGS

The description herein makes reference to the accompanying drawings wherein like reference numerals refer to like parts throughout the several views, and wherein:

FIG. 5 includes graphs showing the hydrogen circulation flow rate, the power consumption of the hydrogen circulation pump and the energy of the discharged hydrogen, each plotted against the nitrogen content in the hydrogen circulation channel and the fuel electrode;

DETAILED DESCRIPTION OF EMBODIMENTS OF THE INVENTION

In order to improve the fuel efficiency in fuel cell systems such at those known in the art, it is desirable to continue operation of the fuel cell in the idle mode for as long as possible. Considering that impurity content increases during operation of the fuel cells in the idle mode, a target control value of the impurity content is set to a low value. However, when the target control value of the impurity content is set to a low value, the impurity concentration at the upstream of the purge valve required for discharging waste gas decreases, thereby leading to an increase in flow rate of hydrogen discharged together with the impurities. This leads to degradation in fuel efficiency under a normal power-generating mode.

In contrast, embodiments of the invention taught herein adequately set the target control value of the impurity content so as to suppress fuel consumption under the normal power generation mode and to increase fuel efficiency by greater use of the idle mode. In general, the target control value of the impurity content in the circulation channel and the fuel electrode is variably set by taking into account the driving mode, i.e., whether the fuel cells are operating in the normal power generation mode or the idle mode. The amount of nitrogen in the circulation channel and the fuel electrode to be discharged through the discharge channel is adjusted on the basis of the target control value.

Figure 1:
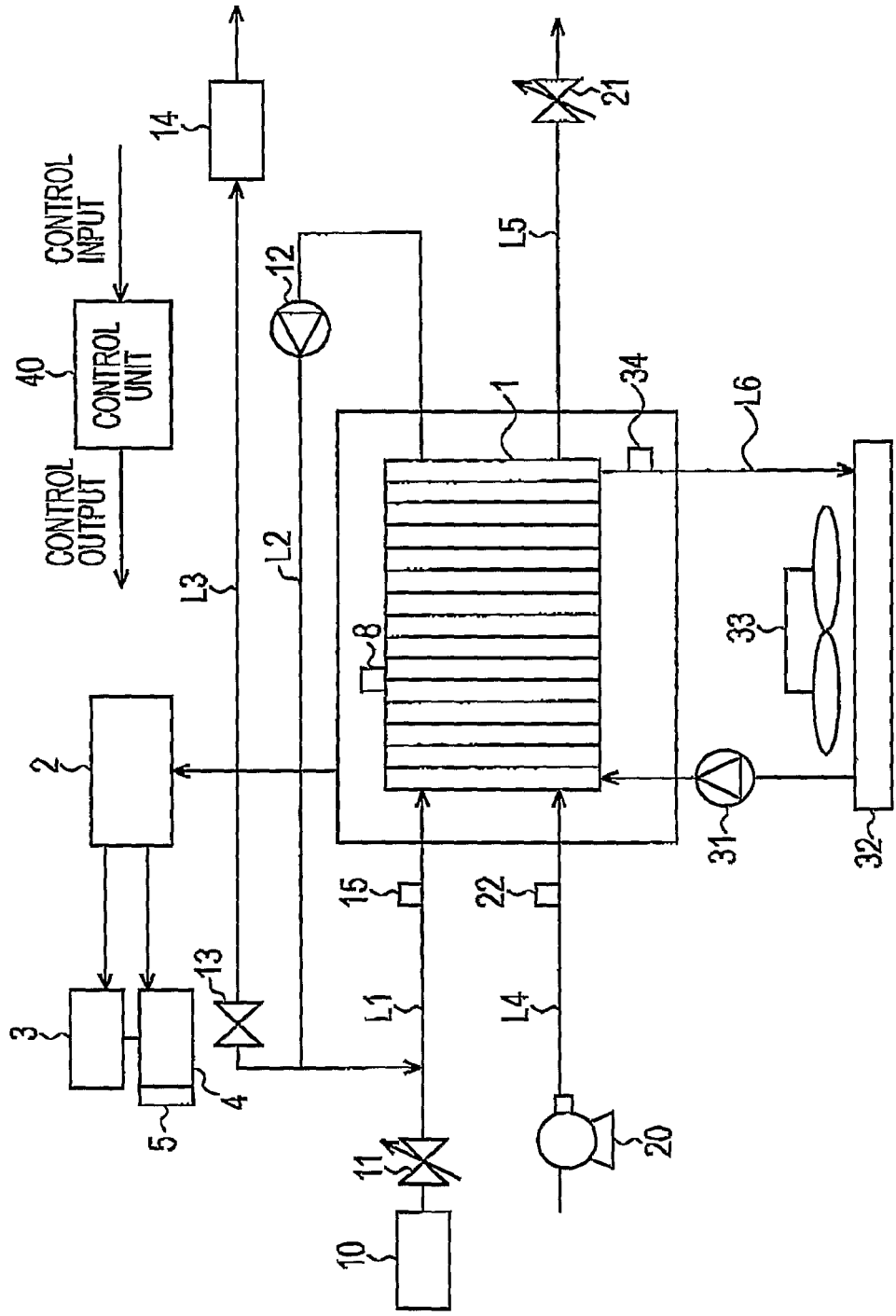
FIG. 1 is a block diagram showing an overall structure of a fuel cell system according to a first embodiment.

FIG. 1 is a block diagram showing the overall structure of a fuel cell system according to a first embodiment of the invention. The fuel cell system is, for example, installed in a vehicle to function as a power supply therefor.

The fuel cell system includes a fuel cell stack 1 constituted by a plurality of fuel cell structures, each having an oxidizer electrode and a fuel electrode facing each other with a proton-exchange membrane (PEM) therebetween and separators sandwiching the fuel cell structures. The fuel cell stack 1 generates power by electrochemically reacting a fuel gas supplied to the fuel electrode with an oxidizer gas supplied to the oxidizer electrode. For example, hydrogen gas can be used as the fuel gas and oxygen can be used as the oxidizer gas.

The fuel cell system further includes a hydrogen system for supplying hydrogen to the fuel cell stack 1, an air system for supplying air to the fuel cell stack 1, and a cooling system for cooling the fuel cell stack 1.

In the hydrogen system, hydrogen is stored in a fuel tank 10 (e.g., a high-pressure hydrogen can) and is supplied to a hydrogen supply side of fuel electrode of the fuel cell stack 1 via a hydrogen supply channel L1. A fuel tank stop valve (not shown) is provided downstream of the fuel tank 10. When the fuel tank stop valve is opened, high-pressure hydrogen gas from the fuel tank 10 is mechanically depressurized to a certain pressure by a pressure reducing valve (not shown) provided downstream of the stop valve. The depressurized hydrogen gas is further depressurized with a hydrogen regulator valve 11 downstream of the pressure reducing valve and is then supplied to the fuel cell stack 1. The opening of the hydrogen regulator valve 11 is controlled with a control unit 40 described below so that the hydrogen pressure supplied to the fuel cell stack 1 (i.e., the pressure of hydrogen at the fuel electrode) is at a desired level.

Waste gas, which contains unused hydrogen and is discharged from the fuel electrode, is introduced to a hydrogen circulation channel L2. The other end of the hydrogen circulation channel L2 is connected to the hydrogen supply channel L1 at a position downstream of the hydrogen regulator valve 11. A hydrogen circulating unit, e.g., a hydrogen circulation pump 12, is in communication with the hydrogen circulation channel L2. The waste gas from a fuel electrode side of the fuel cell stack 1 is circulated to the hydrogen supply channel L1 through the hydrogen circulation channel L2 as the hydrogen circulation pump 12 is driven. The driving rate, i.e., the rotation speed, of the hydrogen circulation pump 12 is controlled with the control unit 40 so that the flow rate of hydrogen supplied to the fuel cell stack 1 is at the target level.

In the case where air is used as the oxidizer gas, the impurities in air permeate from the oxidizer electrode to the fuel electrode; therefore, the impurity content tends to increase in the hydrogen circulation channel L2 and the fuel electrode, and the hydrogen partial pressure tends to decrease. The "impurities" refer to non-fuel gas components, which are components other than the fuel gas (i.e., other than hydrogen). A representative example of the impurities is nitrogen (in this embodiment, only nitrogen is discussed as the impurity for the sake of convenience). If the impurity content, e.g., the nitrogen content, is excessively high, the output of the fuel cell stack 1 may decrease and circulation of hydrogen by the hydrogen circulation pump 12 may be obstructed, resulting in unstable power generation. Thus, it is beneficial to control the nitrogen content in the fuel electrode and the hydrogen circulation channel L2. For this purpose, a waste discharge channel L3 for discharging gas flowing in the hydrogen circulation channel L2 is in communication with the hydrogen circulation channel L2. The waste discharge channel L3 has a purge valve (also called a discharge-amount adjusting unit) 13, and the amount of nitrogen discharged outside through the waste discharge channel L3 can be adjusted by adjusting the opening of the purge valve 13. The waste discharge channel L3 also has a hydrogen diluting device 14 so that hydrogen discharged simultaneously with nitrogen is diluted by being mixed with air before it is released to outside the system. As described below, the opening of the purge valve 13 is controlled with the control unit 40. As a result, the nitrogen content in the fuel electrode and the hydrogen circulation channel L2 can be controlled while maintaining the power generation performance and circulation performance at desired levels.

In the air system, air serving as an oxidizer gas is taken into a compressor 20 and compressed. The compressed air is supplied to the fuel cell stack 1 via an air supply channel L4. The air supply channel L4 is equipped with a humidifier (not shown) so that the air supplied to the fuel cell stack 1 is humidified to a level that does not degrade the power generation performance of the fuel cell stack 1. The waste gas (which includes air from which oxygen is consumed) from the fuel cell stack 1 is discharged outside of the system via an air waste channel L5. The air waste channel L5 is equipped with an air regulating valve 21. The degree of opening of the air regulating valve 21 is controlled with the control unit 40 so that the air pressure supplied to the fuel cell stack 1 (i.e., the air pressure at the oxidizer electrode) is at a target air pressure level. The driving rate, i.e., the rotational speed, of the compressor 20 is controlled with the control unit 40 so that the air flow rate to the fuel cell stack 1 is at the target level while considering the target air pressure.

The cooling system has a closed-loop cooling channel L6 in which cooling water for cooling the fuel cell stack 1 circulates. The cooling channel L6 is equipped with a cooling water circulating pump 31 for circulating the cooling water. As the cooling water circulating pump 31 is operated, the cooling water inside the cooling channel L6 circulates. The cooling channel L6 is also equipped with a radiator 32 and a fan 33 for the radiator 32. The warmed cooling water that cooled the fuel cell stack 1 flows to the radiator 32 via the cooling channel L6 and is cooled in the radiator 32. The cooled cooling water is supplied to the fuel cell stack 1. The cooling channel L6 is highly branched inside the fuel cell stack 1 so that substantially the entire interior of the fuel cell stack 1 can be cooled. The driving rates of the cooling water circulating pump 31 and the fan 33 are controlled with the control unit 40 on the basis of the temperature of cooling water discharged from the fuel cell stack 1.

A power take-off, or load, 2 is connected to the fuel cell stack 1. The load 2 is controlled with the control unit 40, extracts the necessary power from the fuel cell stack 1 and supplies the extracted power to an electric motor 3 for driving a vehicle.

A secondary battery 4 is connected in parallel to the load 2 and the electric motor 3. The secondary battery 4 has multiple functions. First, the secondary battery 4 supplies power required for operation of the auxiliary machineries (e.g., the compressor 20 and the hydrogen circulation pump 12) for operating the fuel cell stack 1 to generate power. Second, in the event that the power generated from the fuel cell stack 1 is insufficient relative to the power required by the system (hereinafter referred to as "the required power"), the secondary battery 4 supplies power corresponding to the deficiency to the electric motor 3. Third, in the event that the power generated from the fuel cell stack 1 is excessive relative to the required power, the secondary battery 4 stores the excessive power and also regenerative electric power from the electric motor 3.

Figure 2:
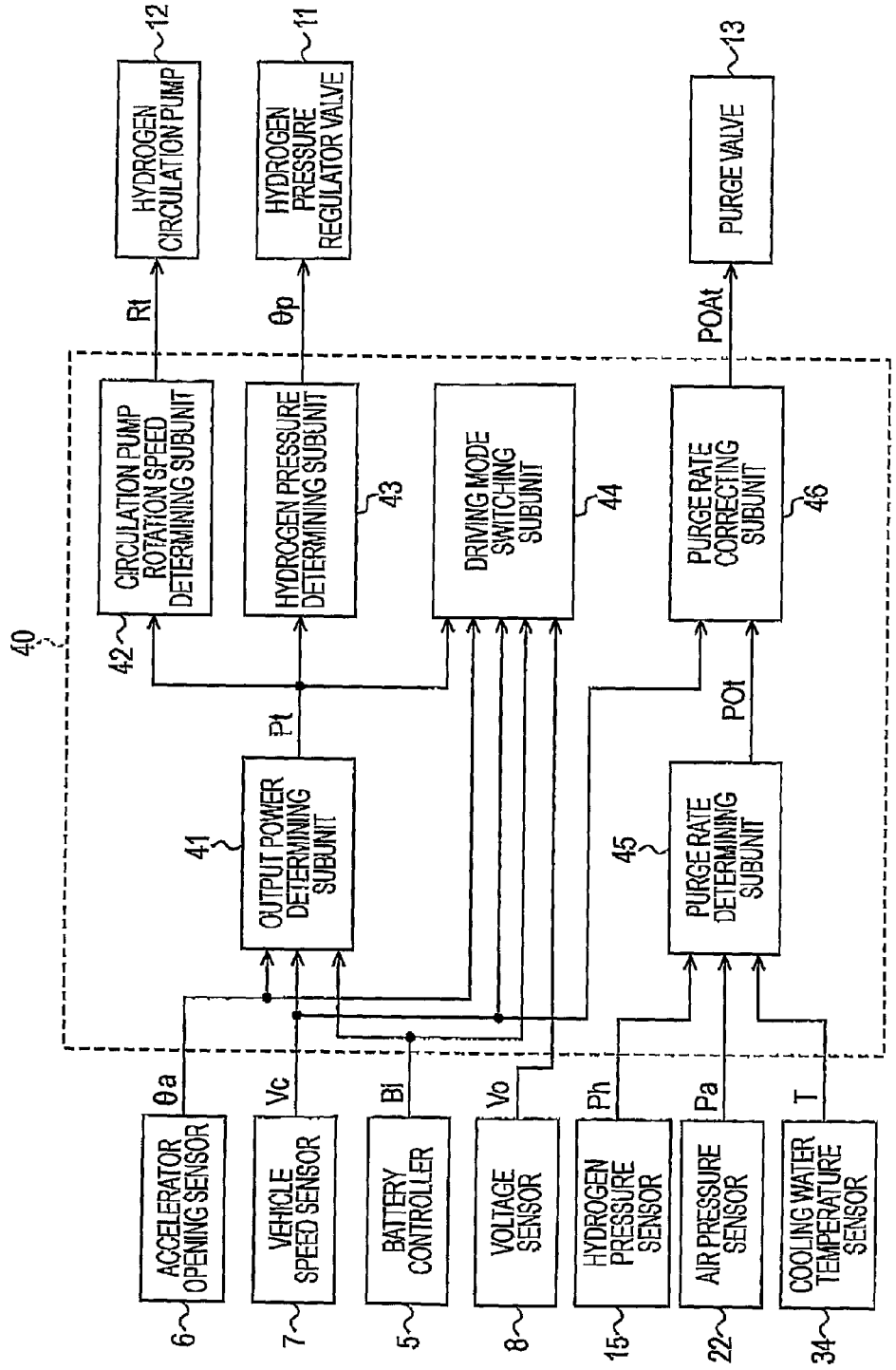
FIG. 2 is a block diagram showing a control unit.

FIG. 2 is a block diagram showing the control unit 40. The control unit 40 integrally controls the entire system and controls the operation status of the fuel cell stack 1 by controlling appropriate parts of the system in accordance with a software control program. A micro computer mainly constituted by a central processing unit (CPU), a read only memory (ROM), a random access memory (RAM), and an input/output (I/O) interface may be used as the control unit 40. The control unit 40 performs various computations on the basis of the status of the system, outputs the computed results as control outputs to various actuators and controls various elements including the purge valve 13, the hydrogen regulator valve 11, the hydrogen circulation pump 12 and the load 2. In order to detect the status of the system, various signals from sensors and the like are input as the control inputs into the control unit 40.

A battery controller 5 detects battery information Bi that indicates the amount of remaining power stored in the secondary battery 4 (hereinafter referred to as "the remaining power level") and the ratio of the power that can be output from the secondary battery 4 to the maximum output (hereinafter referred to as "the available output power"). The battery information Bi is input to the control unit 40 from the battery controller 5. An accelerator opening sensor 6 detects the amount θa of operation of an accelerator pedal (not shown), i.e., the value of acceleration desired by an operator, i.e., a driver. The accelerator opening θa is input from the accelerator opening sensor 6 to the control unit 40. A vehicle speed sensor 7 detects a vehicle speed Vc and inputs the vehicle speed Vc to the control unit 40. A voltage sensor 8 detects a voltage Vo of each cell or each cell group and inputs the voltage Vo to the control unit 40. A hydrogen pressure sensor 15 detects a hydrogen pressure Ph supplied to the fuel electrode of the fuel cell stack 1 and inputs the hydrogen pressure Ph to the control unit 40. An air pressure sensor 22 detects an air pressure Pa supplied to the oxidizer electrode of the fuel cell stack 1 and inputs the air pressure Pa to the control unit 40. A cooling water temperature sensor 34 detects the temperature T of cooling water discharged from the fuel cell stack 1 and circulating in the cooling channel L6. The cooling water temperature T is input from the cooling water temperature sensor 34 to the control unit 40. The power consumed by the compressor 20 and the power consumed by the electric motor 3 (i.e., the required power) are input to the control unit 40 from the compressor 20 and the electric motor 3, respectively, although this is not shown in the drawing.

The control unit 40 can be described on the basis of functions as being constituted by an output power determining subunit 41, a circulation pump rotation speed determining subunit 42, a hydrogen pressure determining subunit 43, a driving mode switching subunit 44, a purge rate determining subunit 45 and a purge rate correcting subunit 46.

The output power determining subunit 41 determines a target output power Pt of the fuel cell stack 1 on the basis of the vehicle speed Vc, the accelerator opening θa and the battery information Bi.

The circulation pump rotation speed determining subunit 42 calculates the target rotation speed Rt of the hydrogen circulation pump 12 on the basis of the target output power Pt. In particular, the circulation pump rotation speed determining subunit 42 calculates the amount of the hydrogen circulation flow required to stably generate the target power Pt. Since the gas flowing in the hydrogen circulation channel L2 contains nitrogen, water vapor and other impurities, the effects of these impurities are taken into account, and the target rotation speed Rt of the hydrogen circulation pump 12 is determined on the basis of the amount of hydrogen circulation flow. The determined target rotation speed Rt is output to the hydrogen circulation pump 12, and the hydrogen circulation pump 12 is driven according to the target rotation speed Rt.

The hydrogen pressure determining subunit 43 determines the amount of hydrogen supplied to the fuel electrode of the fuel cell stack 1 (hereinafter referred to as "the target hydrogen supply amount") and the target hydrogen pressure on the basis of the target output power Pt. The hydrogen pressure determining subunit 43 then determines the opening θp of the hydrogen regulator valve 11 for realizing the target hydrogen pressure and target hydrogen supply amount determined. The opening θp as determined is output to the hydrogen regulator valve 11 (to be more specific, the actuator that operates the hydrogen regulator valve 11), and the opening of the hydrogen regulator valve 11 is set in accordance with the opening θp.

The driving mode switching subunit 44 switches the driving mode of the fuel cell stack 1 between the normal power generation mode and the idle mode on the basis of switching conditions, which can include the target output power Pt, a driving status of the vehicle, a status of the secondary battery 4 and a status of the system. The normal power generation mode is a driving mode in which power required for the system is supplied through power generation in the fuel cell stack 1. The idle mode is a driving mode in which the fuel cell stack 1 stops power generation, and the power required by the system is supplied from a power-storing unit, such as the secondary battery 4. The vehicle speed Vc and the accelerator opening θa are referred to as the driving status of the vehicle. The battery information Bi is referred to as the status of the secondary battery 4. The hydrogen pressure Ph and the voltage Vo of the fuel cell stack 1 are referred to as the status of the system, for example. The driving mode switching subunit 44 selects the normal power generation mode under normal circumstances and determines whether it is possible to stop power generation in the fuel cell stack 1 in order to maintain the driving performance of the vehicle or to adequately maintain the status of the system. In particular, the driving mode switching subunit 44 determines it is possible to stop power generation in the fuel cell stack 1 when all of the following four conditions are met: 1) the target output power Pt is not more than a judgment value set in advance; 2) the vehicle speed Vc is not more than a judgment level set in advance; 3) there is a sufficient output from the secondary battery 4; and 4) authorization for stopping power generation is possible on the basis of the status of the system. When the driving mode switching subunit 44 determines that it is possible to stop power generation, the driving mode switching subunit 44 switches the driving mode from the normal power generation mode to the idle mode. Upon switching the driving mode to the idle mode, the driving mode switching subunit 44 stops operation of various auxiliary machineries and stops power generation in the fuel cell stack 1. Unless all of the four conditions are satisfied, the driving mode switching subunit 44 determines that it is not desirable to stop power generation. Upon determining that it is not desirable to stop power generation, the driving mode switching subunit 44 sets the driving mode to the normal power generation mode.

The purge rate determining subunit 45 determines the opening POt of the purge valve 13 on the basis of the hydrogen pressure Ph, the air pressure Pa and the cooling water temperature T. In particular, the flow rate of nitrogen permeating from the air electrode side to the fuel electrode side is estimated on the basis of the air pressure Pa and the cooling water temperature T, and the purge rate determining subunit 45 determines the opening POt of the purge valve 13 on the basis of this estimate and the hydrogen pressure Ph.

The purge rate correcting subunit 46 takes into account the switching of the driving mode by the driving mode switching subunit 44 and variably sets a target control value Na of the nitrogen content in the hydrogen circulation channel L2 and the fuel electrode. The purge rate correcting subunit 46 controls the opening of the purge valve 13 on the basis of the target control value Na. In particular, the purge rate correcting subunit 46 calculates the corrected opening POAt, which is the final opening of the purge valve 13. The opening POt determined by the purge rate determining unit 45 is corrected to obtain the corrected opening POAt. The purge rate correcting subunit 46 then controls the purge valve 13 on the basis of the corrected opening POAt. The process of correcting the opening by the purge rate correcting subunit 46 is described below.

In a fuel cell system having the above-described structure, nitrogen can be discharged through the waste discharge channel L3, but nitrogen cannot be completely isolated from hydrogen. Thus, hydrogen is discharged together with nitrogen. If the purge valve 13 is opened excessively, an excessive amount of hydrogen is discharged, resulting in a decrease in hydrogen utilization efficiency.

For example, Japanese Unexamined Patent Application Publication No. 2004-185974 discloses a technology in which the opening of the purge valve is changed according to the impurity concentration, the flow rate of gas in the purge valve, the pressure in circulation channels and the temperature of circulation channels. In this manner, the amount of hydrogen discharged is minimized.

In the case where the idle mode is selected as the driving mode and discharge of gas from the waste discharge channel L3 is continued, the inner pressure of the hydrogen circulation channel L2 decreases. As the inner pressure of the hydrogen circulation channel L2 becomes close to atmospheric pressure, discharge of nitrogen may become increasingly difficult. However, even under such a condition, nitrogen keeps permeating from the oxidizer electrode side to the fuel electrode side, and thus the nitrogen content in the hydrogen circulation channel L2 and the fuel electrodes keeps increasing. If the nitrogen content is excessively large, the density of the circulated gas increases beyond the circulation performance limit of the hydrogen circulation pump 12 upon restarting power generation or the amount of excess hydrogen to be circulated into the hydrogen supply channel L1 becomes deficient, thereby failing to stably generate power. Thus, in this embodiment, the purge rate correcting subunit 46 takes into account the switching of the driving mode by the driving mode switching subunit 44 and variably sets the target control value Na of the nitrogen content in the hydrogen circulation channel L2 and the fuel electrode in order to suppress occurrence of such a failure.

Figure 3:
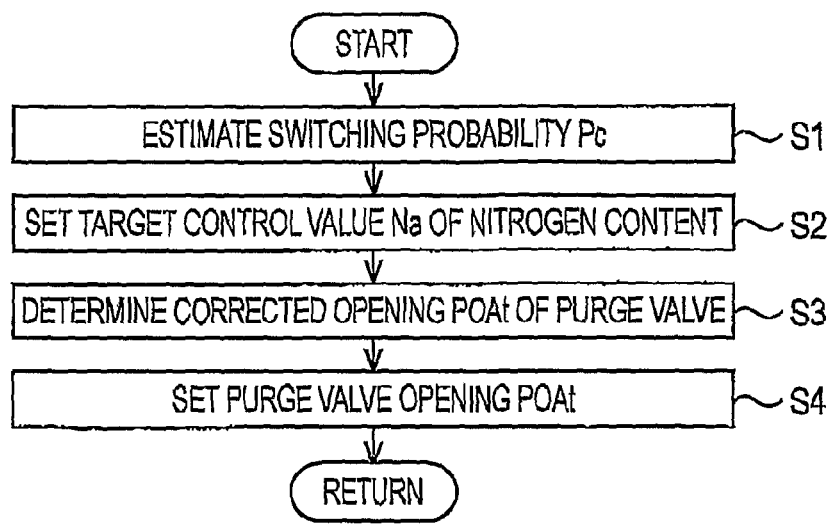
FIG. 3 is a flowchart showing the steps of correcting the opening of a purge valve according to the first embodiment.

FIG. 3 is a flowchart that shows the steps of a process for correcting the opening of the purge valve 13 according to this embodiment. The process shown in this flowchart is called at predetermined intervals and is executed by the control unit 40 (in particular, the purge rate correcting subunit 46). Along with this process, the driving mode switching subunit 44 determines, on the basis of the switching conditions, if it is possible to stop power generation. If the driving mode switching subunit 44 determines that power generation can be stopped, the driving mode switching subunit 44 switches the driving mode from the normal power generation mode to the idle mode. If the driving mode switching subunit 44 determines that the power generation cannot be stopped, the driving mode switching subunit 44 sets the driving mode to the normal power generation mode.

Figure 4A:
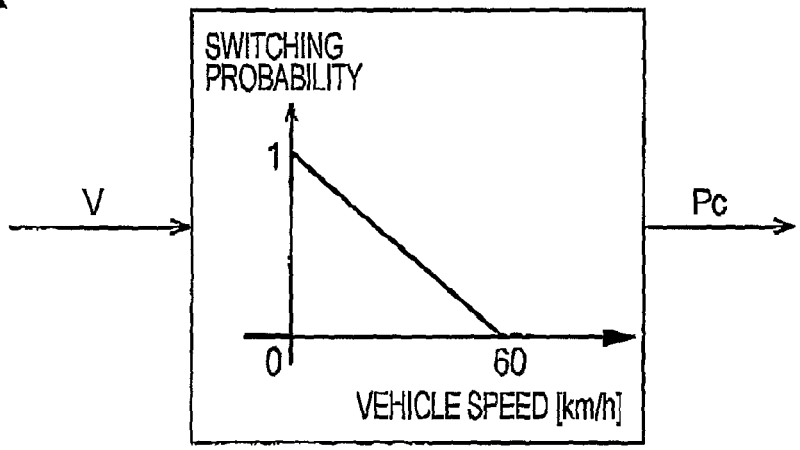
FIGS. 4A and 4B are graphs showing the relationship between the vehicle speed and the switching probability.
Figure 4B:
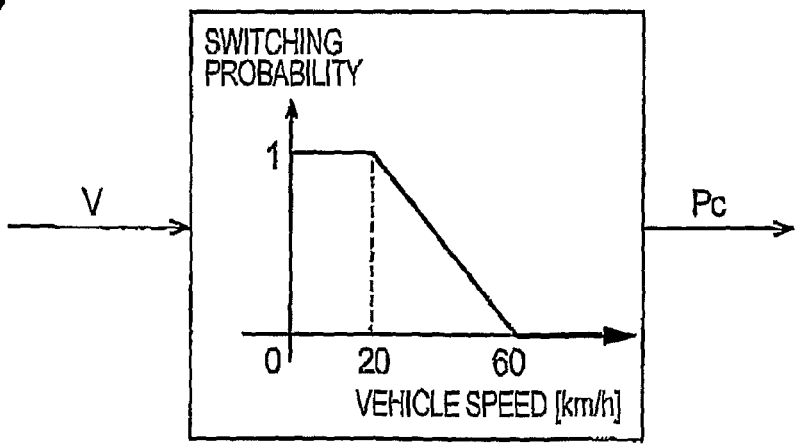

First, in step S1, the probability (hereinafter referred to as "the switching probability") Pc at which the driving mode is switched by the driving mode switching subunit 44 from the normal power generation mode to the idle mode is estimated on the basis of the vehicle speed Vc. FIGS. 4A and 4B show the relationships between the vehicle speed Vc and the switching probability Pc. The relationship between the switching probability Pc and the vehicle speed Vc is, as shown in FIG. 4A, set in advance through experimentation and/or simulation. FIG. 4B is discussed hereinafter.

For example, assume that the judgment vehicle speed, which is a condition for switching the driving mode to the idle mode, is set at 0 km/h for the driving mode switching subunit 44. At a vehicle speed Vc of 0 km/h, the switching condition for the driving mode switching subunit 44 is satisfied, and the switching probability Pc is set to "1". In contrast, when the vehicle is driving at a vehicle speed Vc of 60 km/h or more, the possibility that the switching condition for the idle mode is satisfied is low for the driving mode switching subunit 44. Thus, the switching probability Pc is set to "0". This value "60 km/h" is statistically determined on the basis of the probability at which the vehicle speed drops from 60 km/h or more to 0 km/h within a predetermined time period A, the probability being determined on the basis of investigations on the driving situations of vehicles. For example, the vehicle speed at which the probability is 0.5% or less may be set as this speed. Moreover, the switching probability Pc between 0 km/h and 60 km/h is set as a linear function that decreases from 1 to 0 with the increasing vehicle speed.

The concept behind setting the predetermined time period A as used for determining the switching probability Pc will now be described. In generating a particular level of power in the fuel cell stack 1, the characteristics of the flow rate and the head of the hydrogen circulation pump 12 and the pressure loss characteristics of the fuel electrode of the fuel cell stack 1 and the hydrogen circulation channel L2 are taken into consideration. In this manner, the hydrogen circulation flow rate (i.e., the amount of hydrogen that can be circulated in the fuel cell stack 1 relative to the amount of nitrogen) can be calculated on the basis of the rotation speed of the hydrogen circulation pump 12 and the hydrogen pressure in the fuel cell stack 1. Moreover, the power consumed by the hydrogen circulation pump 12 to realize the hydrogen circulation flow rate can be calculated.

Where a predetermined level of power is generated on the basis of the air pressure and the nitrogen content in the fuel electrode and the hydrogen circulation channel L2 while taking into account the characteristics of the PEM of the fuel cell stack 1, the amount of nitrogen permeating from the fuel electrode to the hydrogen electrode can be determined. Then the opening of the purge valve 13 is set so that the same quantity of gas as is permeated from the fuel electrode to the hydrogen electrode is discharged through the waste discharge channel L3. The amount of hydrogen discharged with nitrogen can be calculated on the basis of the relationship between the opening of the purge valve 13 and the hydrogen and nitrogen contents in the fuel electrode and the hydrogen circulation channel L2. Accordingly, how much energy (power) the fuel cell stack 1 can produce from the discharged hydrogen, i.e., the energy of the discharged hydrogen, can be calculated.

Figure 6:
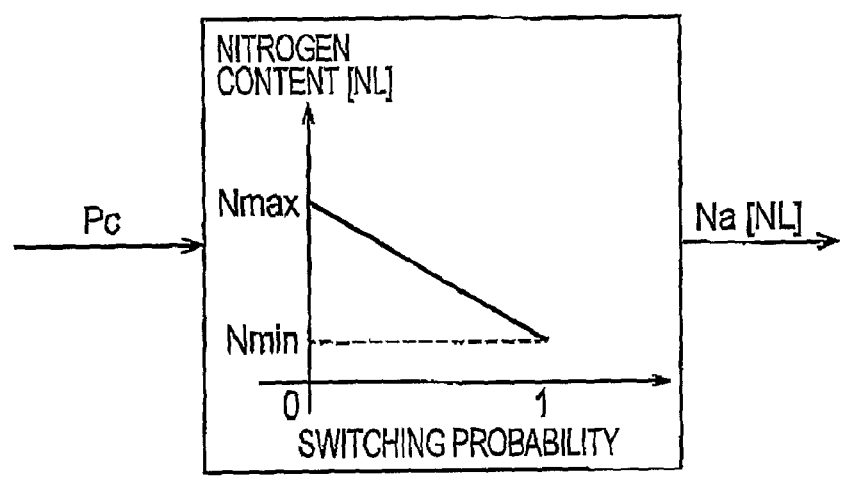
FIG. 6 is a graph showing the relationship between the switching probability and the target control value of the nitrogen content.

FIGS. 5 and 6 are relevant to step S2 of FIG. 3. FIG. 5 includes graphs showing the hydrogen circulation flow rate, the power consumption of the hydrogen circulation pump 12, and the energy of the discharged hydrogen each plotted against the nitrogen content in the hydrogen circulation channel L2 and the fuel electrode. In the graph, curve L1 indicates the hydrogen circulation flow rate plotted versus the nitrogen content and L2 indicates the energy of discharged hydrogen. L3 indicates the power consumption of the hydrogen circulation pump 12, and L4 indicates the sum of L2 and L3. Q1 is the lower limit of the hydrogen circulation flow rate, which is the lowest value at which stable power generation can be performed in the fuel cell stack 1. If the nitrogen content in the fuel electrode and the hydrogen circulation channel L2 is increased beyond the nitrogen content corresponding to this lower limit value, stable power generation cannot be achieved.

In the case where normal power generation is conducted in the fuel cell stack 1, i.e., in the normal power generation mode, the target control value Na of the nitrogen content in the fuel electrode and the hydrogen circulation channel L2 is preferably set to minimize the sum of the power consumption of the hydrogen circulation pump 12 and the energy of the discharged hydrogen. Hereinafter, this nitrogen content is referred to as "maximum efficiency nitrogen content Nmax". When the target control value Na is set to the maximum efficiency nitrogen content Nmax and the opening of the purge valve 13 is controlled on the basis of the maximum efficiency nitrogen content Nmax, the fuel efficiency under the normal power generation mode can be improved. Where the power consumption of the hydrogen circulation pump 12 is low and decreases with the nitrogen content, or where a circulator that does not use external energy is concerned, the nitrogen content that corresponds to the lower limit of the hydrogen circulation flow rate Q1 is set as the maximum efficiency nitrogen content Nmax.

In the case where power generation in the fuel cell stack 1 is stopped, i.e., in the idle mode, nitrogen eventually cannot be discharged from the waste discharge channel L3, and as a result the nitrogen content in the hydrogen circulation channel L2 and the fuel electrode tends to increase. Thus, while the fuel cell is operating in the idle mode, the target control value of the nitrogen content in the fuel electrode and the hydrogen circulation channel L2 is preferably set to a low level on the basis of the assumption that the nitrogen content will increase during the idle mode. Hereinafter, such a nitrogen content is referred to as the "minimum nitrogen content Nmin". In particular, the nitrogen content at which the hydrogen circulation flow to the purge valve 13 is maximized is set to be Nmin. The minimum nitrogen content Nmin can also be regarded as the nitrogen content at which discharged nitrogen is balanced with the amount of nitrogen permeating from the oxidizer electrode side when the purge valve 13 is left open.

Alternatively, the frequency distribution of the time until the driving mode is shifted to the idle mode may be investigated on the basis of the manner in which automobiles are used, and the minimum nitrogen content Nmin can be determined as the initial nitrogen content that does not exceed the hydrogen circulation flow rate lower limit Q1 even after the nitrogen content increases for a certain time covering a large part of the distribution.

With all these factors taken into account, the predetermined time period A is calculated as the time required for the maximum efficiency nitrogen content Nmax to reach the minimum nitrogen content Nmin while completely opening the purge valve 13 on the basis of the integral computation of the difference between the amount of permeating nitrogen and the amount of discharged nitrogen.

FIG. 6 is a graph showing the relationship between the switching probability Pc and the target control value Na of the nitrogen content. In step S2 following S1, the target control value Na is set on the basis of the calculated switching probability Pc. The relationship between the target control value Na and the switching probability Pc is determined in advance through experimentation and/or simulation. As shown in the graph, the target control value Na is set at maximum efficiency nitrogen content Nmax when the switching probability Pc is 0, for example. When the probability that the driving mode is going to be switched to the idle mode is low, the target control value Na is set to be the maximum efficiency nitrogen content Nmax to improve the fuel efficiency under normal power generation mode.

The target control value Na is set to be the minimum nitrogen content Nmin if the switching probability Pc is 1, for example. In such a case where the possibility of switching to the idle mode is high, the target control value Na is set to be the minimum nitrogen content Nmin so that the nitrogen content in the hydrogen circulation channel L2 and the fuel electrode can be adjusted to decrease over time. At a switching probability Pc more than 0 but less than 1, the target control value Na is set as a function that linearly decreases from the maximum efficiency nitrogen content Nmax to the minimum nitrogen content Nmin according to an increase in the switching probability Pc.

Figure 7:
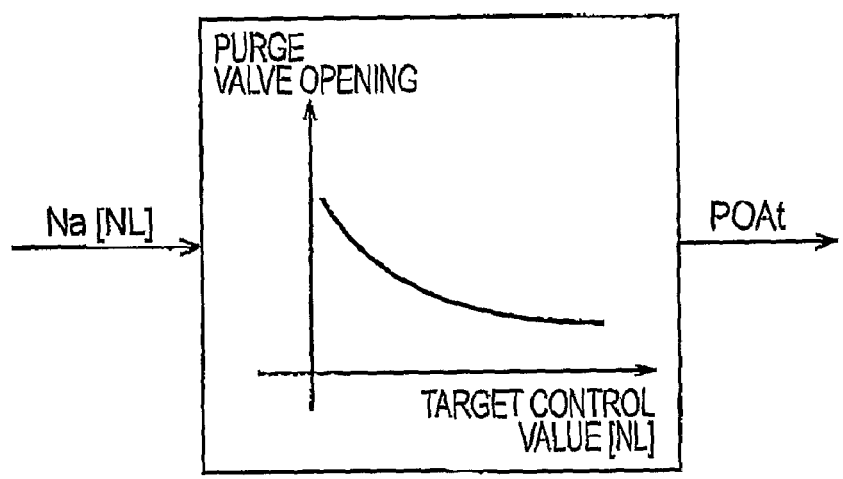
FIG. 7 is a graph showing the relationship between the target control value of the nitrogen content and the corrected opening.

FIG. 7 is relevant to step S3 of FIG. 3. FIG. 7 is a graph showing the relationship between the target control value Na of the nitrogen content and the corrected opening POAt. In step S3, the corrected opening POAt of the purge valve 13 is determined on the basis of the target control value Na set in the previous step. As shown in the graph, the optimum value of the corrected opening POAt for realizing the target control value Na is set in advance through experimentation and/or simulation. In the example shown in the graph, the corrected opening POAt is set to be a function that decreases with increasing target control value Na.

The method for determining the corrected opening POAt relative to the target control value Na is not limited to determining the relationship between these two in advance. For example, an instrument that measures the nitrogen content in the fuel electrode and the hydrogen circulation channel L2 on site may be installed to the hydrogen circulation channel L2, or the nitrogen content may be calculated real time. Then the amount to be increased or decreased relative to the corrected opening POAt set by the purge rate determining subunit 45 may be determined on the basis of the difference between the target control value Na and the observed nitrogen content. Here, "opening of the purge valve 13" means the area of the opening if the purge valve 13 is controlled on the basis of the area of the opening and means the ratio of the time the valve is open to the time the valve is shut (that is, an average valve open time) if the valve is an ON/OFF valve.

In step S4 of FIG. 3, the opening POt of the purge valve 13 determined in the purge rate determining subunit 45 is overwritten on the basis of the corrected opening POAt of the purge valve 13 calculated in S3, and the resulting value is set as the final corrected opening POAt.

As described above, in the fuel cell system of this embodiment, the purge rate correcting subunit 46 takes into account the switching of the driving mode between the normal power generation mode and idle mode by the driving mode switching subunit 44 and variably sets the target control value Na in the hydrogen circulation channel L2 and the fuel electrode. The purge rate correcting subunit 46 controls the corrected opening POAt on the basis of the target control value Na.

According to this system, since the target control value Na can be variably set by taking the driving mode into account, the nitrogen content in the hydrogen circulation channel L2 and the fuel electrode can be controlled to suit the driving mode to be switched. As a result, compared to when the nitrogen content is controlled without considering the driving mode, the nitrogen content can be optimally controlled in all driving modes. Thus, degradation in fuel efficiency under the normal power generation mode can be suppressed while improving the fuel efficiency under the idle mode.

In this embodiment, the purge rate correcting subunit 46 variably sets the target control value Na of the nitrogen content within the range from the minimum nitrogen content Nmin to the maximum efficiency nitrogen content Nmax, which is larger than Nmin. The minimum nitrogen content Nmin is a value (does not have to be an exact value) that corresponds to the nitrogen content at which the flow rate of hydrogen circulated by the hydrogen circulating unit is maximum. In particular, since the nitrogen content will increase during the idle mode, the target control value Na is preferably set to the minimum nitrogen content Nmin. In contrast, the maximum efficiency nitrogen content Nmax is a value (does not have to be exact value) that corresponds to the nitrogen content at which the sum of the power that can be generated in the fuel cell stack 1 and the power consumed by the hydrogen circulating unit is minimum. Thus, from the viewpoint of improving the fuel efficiency under the normal power generation mode, the target control value Na content is preferably set to maximum efficiency nitrogen content Nmax.

According to this system, the target control value Na of the nitrogen content is set to a value optimum for each of the driving modes within the range of minimum nitrogen content Nmin to the maximum efficiency nitrogen content Nmax. Thus, the nitrogen content can be controlled to a value optimum for the driving mode, the degradation in fuel efficiency under the normal power generation mode can be suppressed, and the fuel efficiency under the idle mode can be improved.

In this embodiment, the purge rate correcting subunit 46 estimates the switching probability Pc at which the driving mode will be switched from the normal power generation mode to the idle mode on the basis of the parameter, i.e., the driving mode switching condition in the driving mode switching subunit 44, and variably sets the target control value Na of the nitrogen content on the basis of the estimated switching probability Pc.

According to this system, whether the current status is likely to result in switching of the driving mode can be determined by estimating the switching probability Pc. Thus, the target control value Na can be changed according to the estimation of the switching probability Pc, and the nitrogen content can be adequately controlled to suit the respective driving modes. As a result, degradation in fuel efficiency during the normal generation mode can be suppressed while improving the fuel efficiency under the idle mode.

In this embodiment, the purge rate correcting subunit 46 sets the target control value Na of the nitrogen content to the minimum nitrogen content Nmin when the switching probability Pc is maximum and to the maximum efficiency nitrogen content Nmax when the switching probability Pc is minimum. The target control value Na is set to a value between the minimum nitrogen content Nmin and the maximum efficiency nitrogen content Nmax when the switching probability Pc is between the minimum and the maximum.

According to this system, in the case where the driving mode is switched to or is highly likely to be switched to the idle mode, the target control value Na of the nitrogen content is decreased from the maximum efficiency nitrogen content Nmax. Thus, compared to when the target control value Na is always set to the minimum nitrogen content Nmin, the fuel efficiency in the normal driving mode can be improved. Moreover, compared to when the target control value Na is always set to the maximum efficiency nitrogen content Nmax, the idle mode can continue for a longer time. Thus, the fuel efficiency can be improved as a result of the prolonged idle mode.

In the example shown in FIG. 4A, the switching probability Pc is 0 only when the vehicle speed Vc is 0 km/h. However, other arrangements are also possible. For example, when the judgment vehicle speed that corresponds to the condition for switching to the idle mode is 20 km/h, or when the actual delay in controlling the nitrogen content corresponding to the target control value Na of the nitrogen content is taken into consideration, the switching probability Pc corresponding to a vehicle speed in the range of 0 to 20 km/h can be set to be 0, as shown in FIG. 4B.

Alternatively, the probability at which the vehicle speed becomes 0 km/h within the predetermined time period A may be statistically studied within the vehicle speed range of 0 to 60 km/h, and then the switching probability Pc can be determined on the basis of the results.

In this embodiment, the purge valve 13 controls the discharge amount of nitrogen inside the hydrogen circulation channel L2 and the fuel electrode. Thus, by decreasing the target control value Na of the nitrogen content from the maximum efficiency nitrogen content Nmax on the basis of the switching probability Pc, the corrected opening POAt of the purge valve 13 is set according to the target control value Na so as to decrease the nitrogen content in the fuel electrode and the hydrogen circulation channel L2. Alternatively, other methods for controlling the discharge amount of nitrogen may be used. Examples of such methods are as follows.

First, the opening of the hydrogen regulator valve 11 may be increased to increase the amount of hydrogen supplied from the fuel tank 10 and to increase the pressure in the fuel electrode of the fuel cell stack 1 and the hydrogen circulation channel L2. As a result, the flow rate of the discharge gas discharged from the waste discharge channel L3 increases and the amount of nitrogen discharged increases, thereby decreasing the nitrogen content. Second, the rotation speed of the hydrogen circulation pump 12 may be decreased. As a result, the concentration of nitrogen discharged from the fuel electrode per unit time increases, resulting in an increase in amount of nitrogen discharged and a decrease in the nitrogen content. Third, the opening of the air regulating valve 21 may be increased to decrease the air pressure at the oxidizer electrode. As a result, the difference in nitrogen partial pressure between the fuel electrode and the oxidizer electrode is reduced, and the amount of permeation of nitrogen decreases as a result. Thus, the amount of nitrogen discharged relative to the amount of permeating nitrogen can be increased, and the nitrogen content can be reduced. Fourth, the opening of the air regulating valve 21 may be increased to decrease the air pressure at the oxidizer electrode, and the rotation speed of the compressor 20 may be increased to increase the air flow rate supplied to the oxidizer electrode. Since this tends to cause the electrolytic membrane to be dry and decreases the nitrogen permeation coefficient, the amount of permeating nitrogen decreases. Thus, the amount of nitrogen discharged relative to the amount of nitrogen permeated can be increased, and the nitrogen content can be reduced. Fifth, the rotation speed of the fan 33 or the cooling water circulating pump 31 may be increased to decrease the temperature of the fuel cells. As a result, the amount of nitrogen discharged relative to the amount of permeated nitrogen increases, and the nitrogen content can be decreased. In this embodiment, not only the purge valve 13 but also various elements described in the first to fifth techniques above can contribute to controlling the amount of impurity discharged through waste discharge channel L3.

It should be noted that in the above description of this embodiment, the switching probability Pc is calculated on the basis of the vehicle speed Vc, and then the target control value Na of the nitrogen content is calculated. The invention is not limited to this process. Where the driving mode switching subunit 44 switches the driving mode from the normal power generation mode to the idle mode under the condition that the speed of the movable object is not more than the judgment speed, the relationship between the vehicle speed Vc and the target control value Na may be determined. That is, the switching probability Pc and then the target control value Na may be directly calculated from the vehicle speed on the basis of this relationship. When the vehicle speed V is not more than the judgment speed, the purge rate correcting subunit 46 sets the target control value Na to be the minimum nitrogen content Nmin. As the vehicle speed V increases from the judgment speed, the target control value Na is set to a value higher than the minimum nitrogen content Nmin but not higher than the maximum efficiency nitrogen content Nmax. This arrangement also has the same effects as the embodiment described above and can decrease the complexity of computation.

Figure 8:
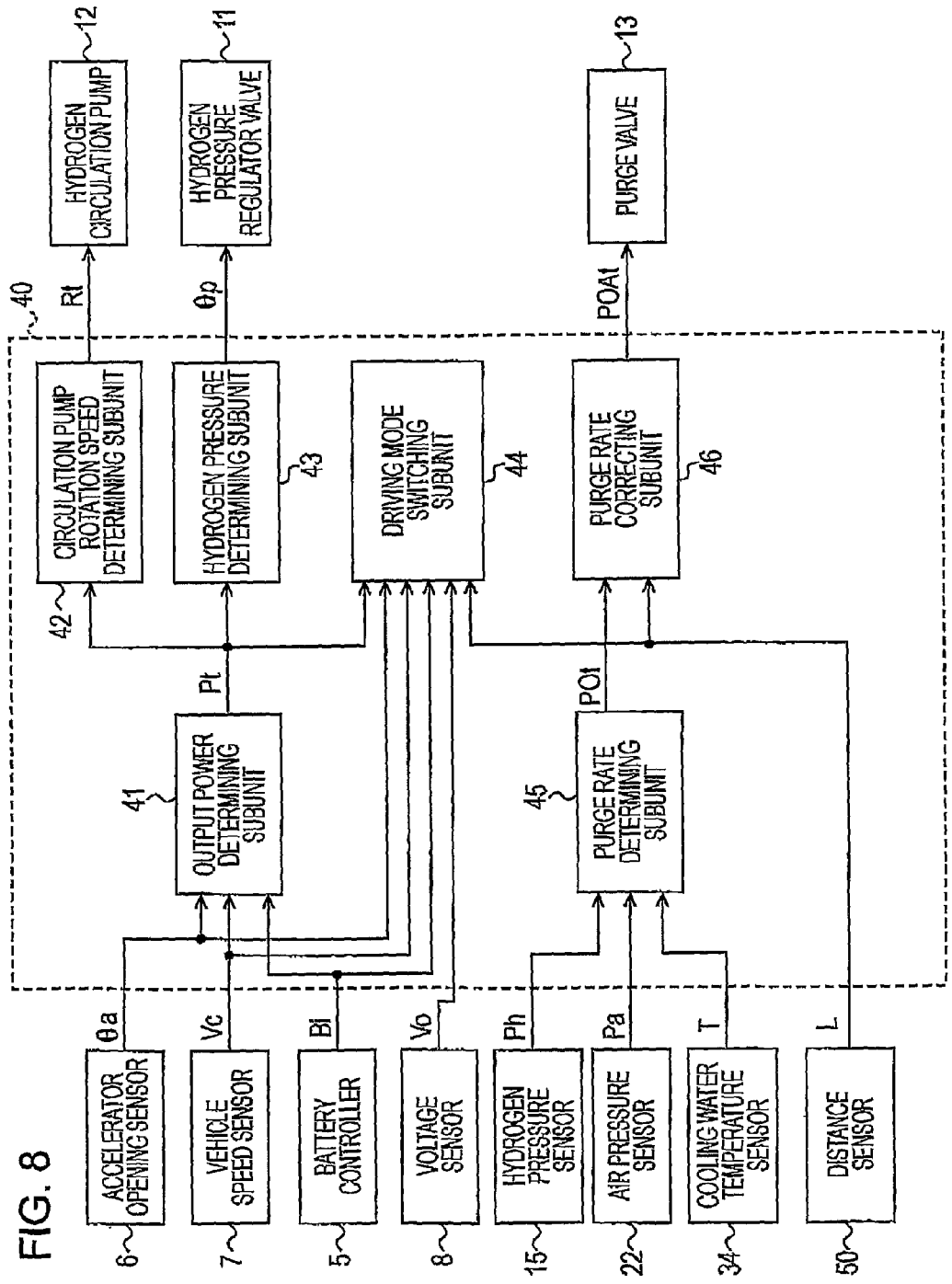
FIG. 8 is a block diagram showing the structure of a control unit in a fuel cell system of a second embodiment.

FIG. 8 is a block diagram showing the structure of a control unit 40 in a fuel cell system of a second embodiment of the invention. The fuel cell system of the second embodiment differs from that of the first embodiment in the method for estimating the switching probability Pc by the control unit 40 (to be more specific, the purge rate correcting subunit 46). Since the basic system configuration and the correction of the opening of the purge valve 13 are identical to those of the first embodiment, the descriptions thereof are omitted to avoid redundancy. The differences are mainly discussed below.

As shown in FIG. 8, a control signal, i.e., a detection signal, is input from a distance sensor 50 to the control unit 40. The distance sensor 50 determines the distance to a subject in front of or behind the vehicle. The distance sensor 50 detects a relative distance L from the vehicle to a subject relative to the travelling direction of the vehicle. Examples of the distance sensor 50 include sensors such as laser readers, millimeter-wave radars and image processors that use captured images in image recognition.

In the control unit 40, the relative distance L is input to the driving mode switching subunit 44 and the purge rate correcting subunit 46.

The driving mode switching subunit 44 determines that the shifting to the idle mode is desirable if the relative distance to the subject is not more than a judgment distance while satisfying the four conditions described in the first embodiment. The judgment distance is a relative distance to the subject at which a driver is forced to stop the vehicle. The optimum value of the judgment distance is set in advance through experimentation and/or simulation. For example, the judgment distance can be 0.5 m.

Figure 9:
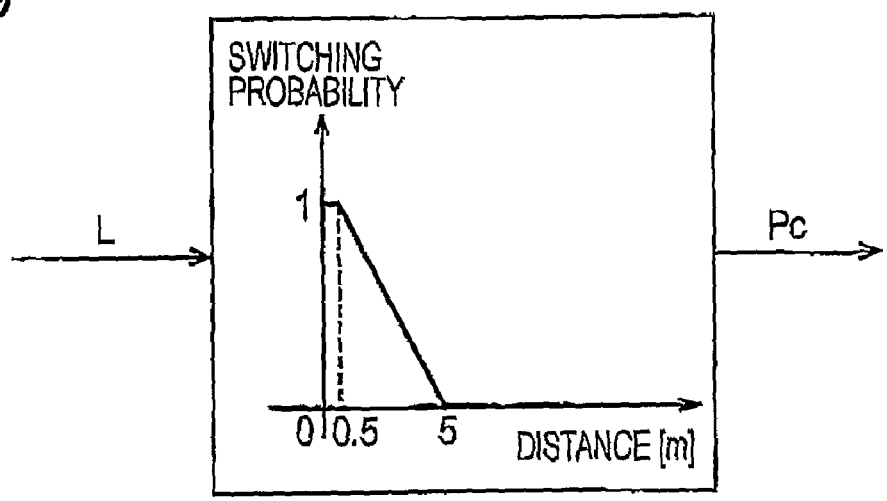
FIG. 9 is a graph showing the relationship between the relative distance and the switching probability.

FIG. 9 is a graph showing the relationship between the relative distance L and the switching probability Pc. On the basis of the relative distance L to the subject, the purge rate correcting subunit 46 estimates the switching probability Pc. The relationship between the switching probability Pc and the relative distance L is set in advance through experimentation and/or simulation, such as shown in FIG. 5. In particular, if the relative distance L is 0.5 m or less, the switching condition for the driving mode switching subunit 44 is satisfied, and the switching probability Pc is set to 1. If the relative distance L is 5 m or more, the possibility that the switching condition for switching to the idle mode in the driving mode switching subunit 44 will be satisfied is low, and the switching probability Pc is set to 0. The distance "5 m" is statistically determined on the basis of the probability at which the relative distance to the subject becomes 0.5 m or less within the predetermined time period A, the probability being determined on the basis of the statistical studies on vehicular gaps during traffic congestion. For example, the distance is set to be a relative distance at which the probability of switching modes is 0.5% or less. The switching probability Pc in the range between 0.5 m and 5 m is set as a linear function. The purge rate correcting subunit 46 sets the target control value Na of the nitrogen content on the basis of the estimated switching probability Pc and determines the corrected opening POAt of the purge valve 13 on the basis of the target control value Na.

As mentioned above, in this embodiment, the driving mode switching subunit 44 switches the driving mode from the normal power generation mode to the idle mode if the relative distance L between the movable object driven by the power supplied from the system and the subject present in the travelling direction of the movable object is less than or equal to the judgment distance set in advance as a driving mode switching condition. The purge rate correcting subunit 46 estimates the switching probability Pc on the basis of the relative distance L to the subject.

According to this system, estimating the switching probability Pc determines whether the current situation is one that is likely to result in switching of the driving mode or not. Thus, the target control value Na of the nitrogen content can be changed by taking switching of the driving mode into consideration beforehand. Thus, the nitrogen content can be adequately controlled to suit the switching of the driving mode. As a result, the fuel consumption under the normal power generation mode can be suppressed while improving the fuel efficiency under the idle mode.

In this embodiment, the switching probability Pc is calculated on the basis of the relative distance L to the subject, and then the target control value Na of the nitrogen content is calculated. However, the invention is not limited to this arrangement. The relationship between the relative distance L to the subject and the target control value Na may be established by taking the switching probability Pc into account, and the target control value Na may be directly calculated from the relative distance L on the basis of this relationship. In such a case, when the relative distance L is not more than the judgment distance, the target control value Na is set to the minimum nitrogen content Nmin. Then, as the relative distance L increases from the judgment distance, the target control value Na increases to a value higher than the minimum nitrogen content Nmin but not higher than the maximum efficiency nitrogen content Nmax. This arrangement also has the same effects as the embodiment described above and can decrease the complexity of computation.

In this embodiment, the switching probability Pc is estimated solely on the basis of the distance L to the subject in the travelling direction. Alternatively, as described in the first embodiment, the vehicle speed Vc may be input to the purge rate correcting subunit 46, and the switching probability Pc may be estimated on the basis of the combination of the vehicle speed and the relative distance L to the subject. For example, the switching probability Pc may be estimated from the vehicle speed and from the distance L. For example, when a vehicle stops at a red traffic light at a leading position, the distance to a shielding subject is great. However, the accuracy of estimation of the switching probability Pc can be increased by taking the vehicle speed into consideration.

Figure 10:
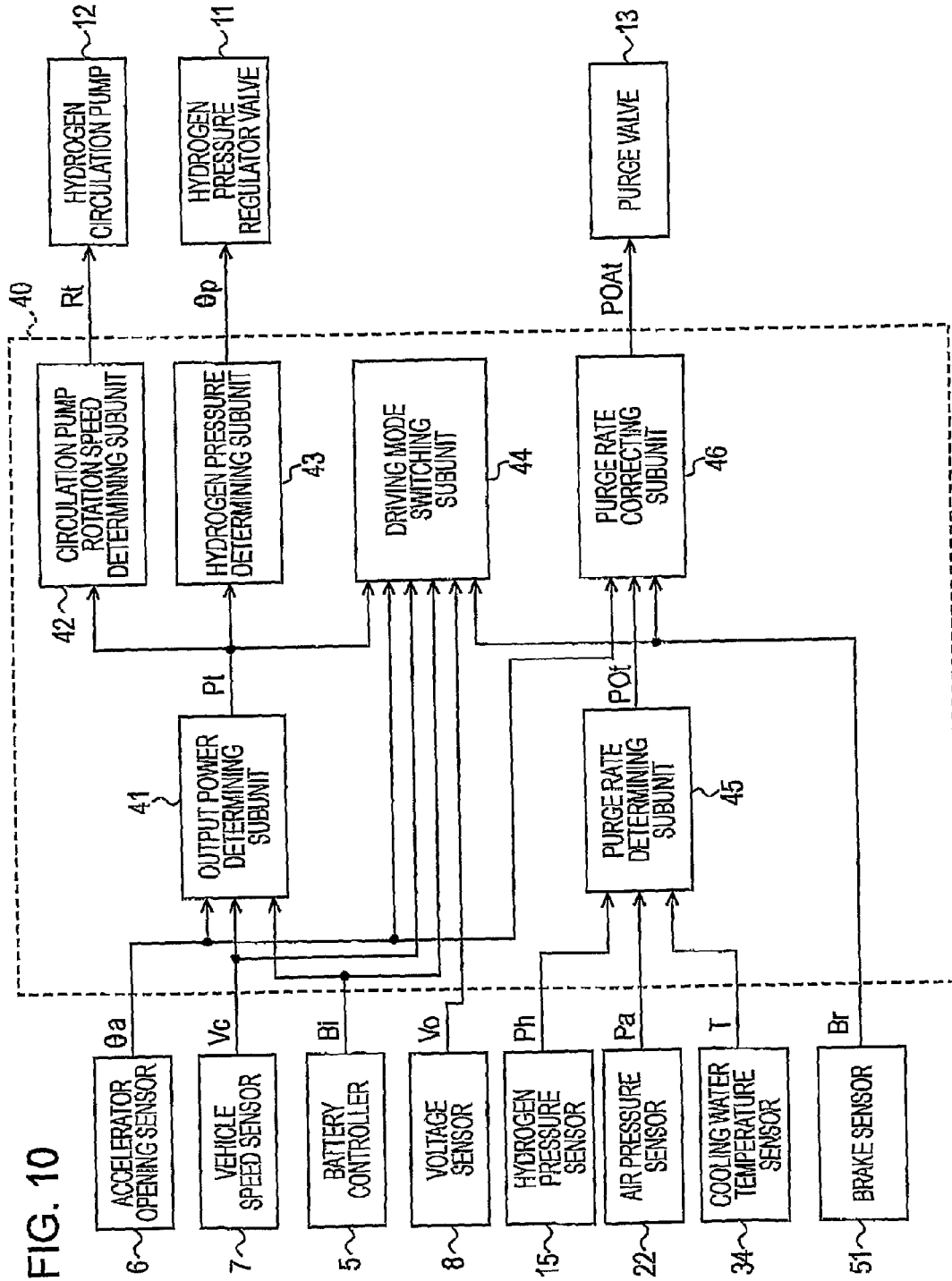
FIG. 10 is a block diagram showing the structure of a control unit of a fuel cell system of a third embodiment.

FIG. 10 is a block diagram showing the structure of a control unit 40 of a fuel cell system of a third embodiment of the invention. The fuel cell system of the third embodiment differs from that for the first embodiment in the method for estimating the switching probability Pc by the control unit 40 (to be more precise, the purge rate correcting subunit 46). Since the basic system configuration and the correction of the opening of the purge valve 13 are identical to those of the first embodiment, the descriptions thereof are omitted to avoid redundancy. The differences are mainly discussed below.

As shown in FIG. 10, a control input, i.e., a detection signal, from a brake sensor 51 is input to the control unit 40. The brake sensor 51 is an ON/OFF sensor that detects whether the brake pedal (not shown) is depressed or not. The brake sensor 51 outputs a brake signal Br, which is an ON signal when the brake petal is depressed and an OFF signal when the brake pedal is not depressed.

In the control unit 40, the brake signal Br from the brake sensor 51 is input to the driving mode switching subunit 44 and the purge rate correcting subunit 46. The accelerator opening θa detection signal from the accelerator opening sensor 6 is also input to the driving mode switching subunit 44 and the purge rate correcting subunit 46.

The driving mode switching subunit 44 determines that power generation can be stopped if the four conditions described in the first embodiment and the following condition are satisfied. That is, the accelerator opening θa is 0 deg (also called a judgment acceleration request value) or less, or the brake signal Br is an ON signal, i.e., the operator requests deceleration.

Figure 11A:
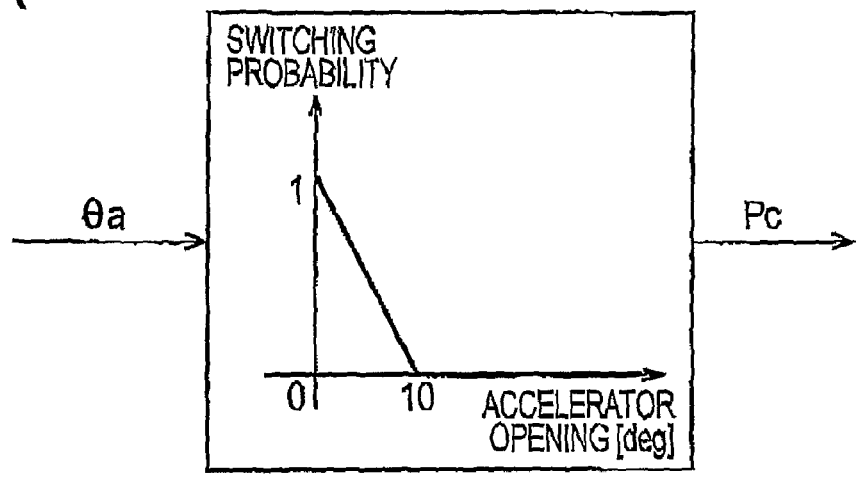
FIG. 11A is a graph showing the relationship between the accelerator opening and the switching probability and FIG. 11B is a graph showing the relationship between the brake signal and the switching probability.
Figure 11B:
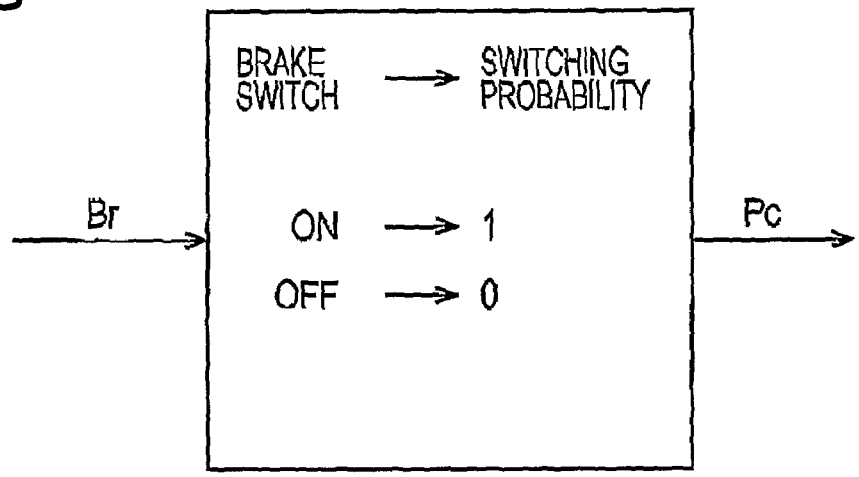

FIG. 11A is a graph showing the relationship between the accelerator opening θa and the switching probability Pc. FIG. 11B is a graph showing the relationship between the brake signal Br and the switching probability Pc. The purge rate correcting subunit 46 estimates the switching probability Pc on the basis of the accelerator opening θa or the brake signal Br. As shown in FIGS. 11A and 11B, relationships with the accelerator opening θa and the brake signal Br are set in advance through experimentation and/or simulation. In particular, if the accelerator opening θa is not more than the judgment acceleration request value (0 deg), the switching condition for the driving mode switching subunit 44 is satisfied, and the switching probability Pc is set to 1. If the accelerator opening θa is 10 deg or more, the possibility that the switching conditions required for switching to the idle mode are satisfied in the driving mode switching subunit 44 is low. Thus, the switching probability Pc is set to 0. This value "10 deg" is statistically determined on the basis of the probability at which the accelerator opening θa becomes 0 within the predetermined time period A. For example, an accelerator opening θa at which this probability is 0.5% or less is determined as this value. The switching probability Pc is set as a linear function between 0 deg and 10 deg.

If the brake signal Br is an ON signal, the switching condition for the driving mode switching subunit 44 is satisfied; thus, the switching probability Pc is set to 1. If the Br is an OFF signal, the switching condition for the secondary battery 4 is not satisfied; thus, the switching probability Pc is set to 0. The purge rate correcting subunit 46 then sets the target control value Na on the basis of the estimated switching probability Pc and determines the corrected opening POAt of the purge valve 13 on the basis of the target control value Na.

As described above, in this embodiment, the driving mode switching subunit 44 switches the driving mode from the normal power generation mode to the idle mode if the acceleration request value θa is not more than the judgment acceleration request value set in advance as a driving mode switching condition. The driving mode switching subunit 44 also switches the driving mode from the normal power generation mode to the idle mode if a deceleration requirement from the operator is input, i.e., if an ON signal is input as the brake signal Br. The purge rate correcting subunit 46 estimates the switching probability Pc on the basis of the accelerator opening θa or the brake signal Br.

According to this system, estimating the switching probability Pc determines whether the current situation is one that is likely to result in switching the driving mode. Thus, the target control value Na of the nitrogen content can be changed by taking switching of the driving mode into consideration beforehand. Thus, the nitrogen content can be adequately controlled to suit the switching of the driving mode. As a result, the fuel consumption under the normal power generation mode can be suppressed while improving the fuel efficiency under the idle mode.

In this embodiment, the switching probability Pc is calculated on the basis of the acceleration request value θa, and then the target control value Na of the nitrogen content is calculated. However, the invention is not limited to this arrangement. The relationship between the acceleration request value and the target control value Na may be established by taking the switching probability Pc into account, and the target control value Na may be directly calculated from the acceleration request value on the basis of this relationship. In such a case, when the acceleration request value is not more than the judgment acceleration request value, the target control value Na is set to the minimum nitrogen content Nmin. Then as the acceleration request value increases from the judgment acceleration request value, the target control value Na is set to a value higher than the minimum nitrogen content Nmin but not higher than the maximum efficiency nitrogen content Nmax. This arrangement also has the same effects as the embodiments described above and can decrease the complexity of computation.

In this embodiment, the switching probability Pc is calculated on the basis of whether there is a deceleration request (whether an ON or OFF signal is input as the brake signal Br), and then the target control value Na of the nitrogen content is calculated. However, the invention is not limited to this arrangement. The relationship between presence or absence of the deceleration request and the target control value Na may be established by taking the switching probability Pc into account, and then the target control value Na can be directly determined from the presence or absence of the deceleration request on the basis of this relationship. In such a case, the purge rate correcting subunit 46 sets the target control value Na to the minimum nitrogen content Nmin if there is a deceleration request and to maximum efficiency nitrogen content Nmax if there is no deceleration request. This arrangement also has the same effects as the embodiment described above and can decrease the complexity of computation.

Figure 12:
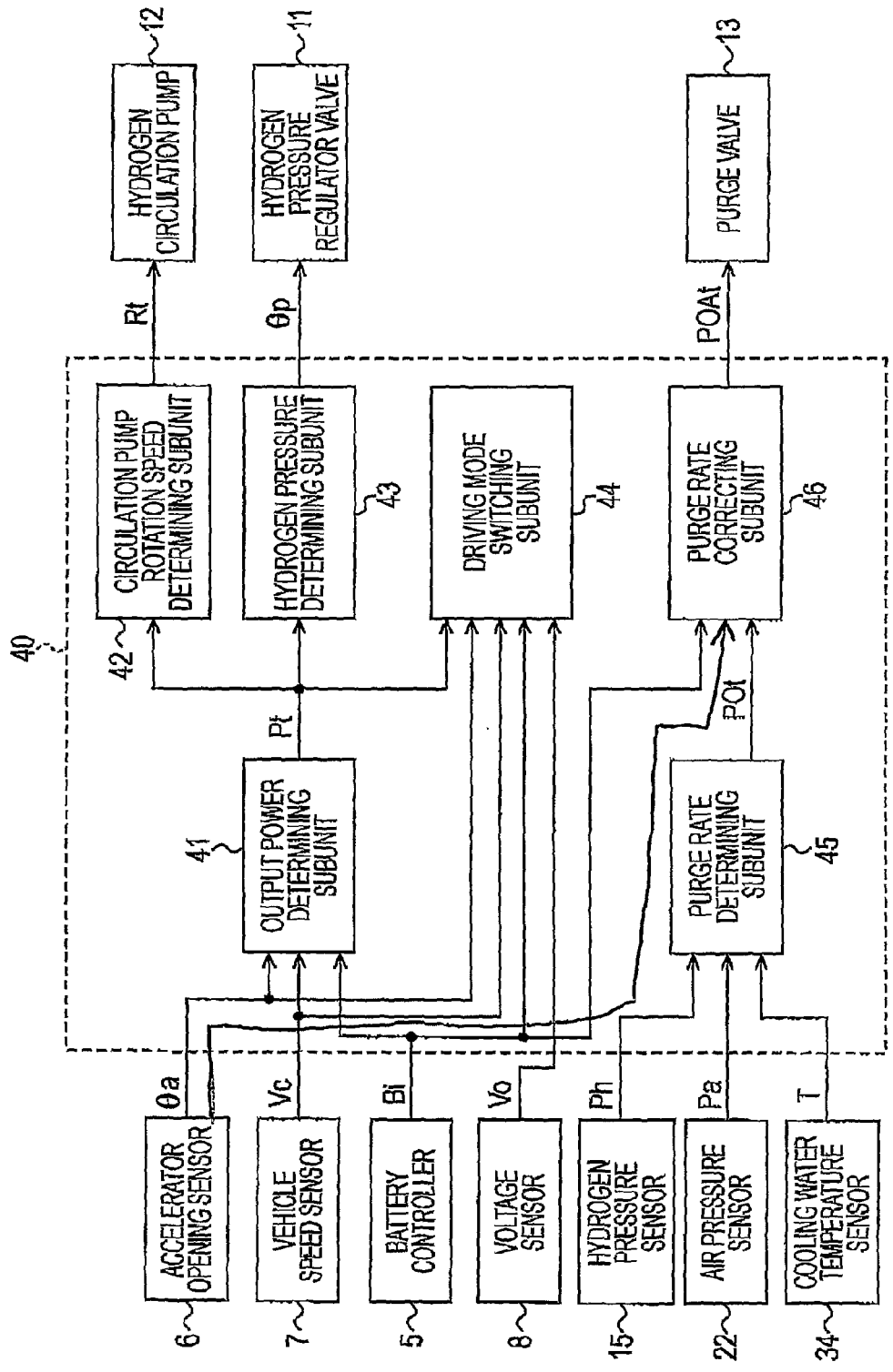
FIG. 12 is a block diagram showing the structure of a control unit in a fuel cell system according to a fourth embodiment.

FIG. 12 is a block diagram showing the structure of a control unit 40 in a fuel cell system according to a fourth embodiment of the invention. The fuel cell system of the fourth embodiment differs from that of the first embodiment in the method for estimating the switching probability Pc by the control unit 40 (to be more precise, the purge rate correcting subunit 46). Since the basic system configuration and the correction of the opening of the purge valve 13 are identical to those of the first embodiment, the descriptions thereof are omitted to avoid redundancy. The differences are mainly discussed below.

As in the first embodiment, a control input, i.e., a battery information Bi, is input from the battery controller 5 to the control unit 40. In the control unit 40, the battery information Bi from the battery controller 5 is input to the driving mode switching subunit 44 and the purge rate correcting subunit 46. The accelerator opening θa detection signal from the accelerator opening sensor 6 is also input to the driving mode switching subunit 44 and the purge rate correcting subunit 46.

Among the four switching conditions described in the first embodiment for the driving mode switching subunit 44, the switching condition related to the secondary battery 4 is changed. For example, the remaining power level can be compared to a judgment remaining power level (e.g., 50% or more). Alternatively, among the four switching conditions described in the first embodiment for the driving mode switching subunit 44, the switching condition related to the secondary battery 4 may be changed to comparing the available output power to a judgment available output power (e.g., 80% or more).

Figure 13A:
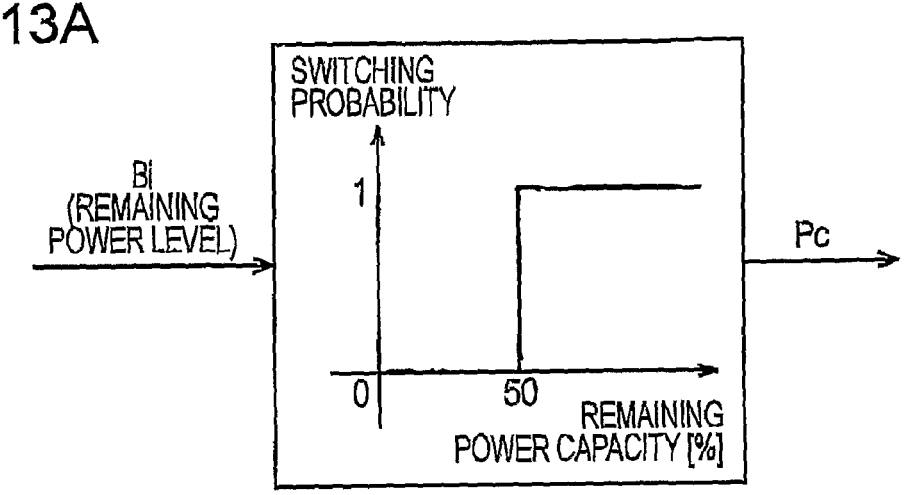
FIGS. 13A and 13B are graphs showing the relationships between the battery information and the switching probability.
Figure 13B:
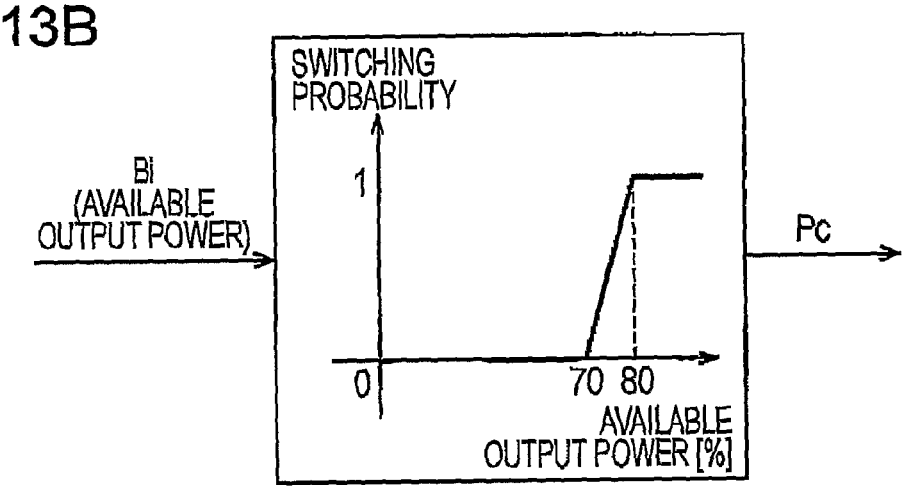

FIGS. 13A and 13B are graphs showing the relationships between the battery information Bi and the switching probability Pc. The purge rate correcting subunit 46 estimates the switching probability Pc on the basis of the battery information Bi. As shown in FIG. 13A, the relationship between the switching probability Pc and the remaining power level, i.e., the battery information Bi, is set in advance through experimentation and/or simulation by assuming that the remaining power level is used a switching condition for the driving mode switching subunit 44. In particular, at a remaining power level of 50% or more, the switching condition is satisfied in the driving mode switching subunit 44, and the switching probability Pc is set to 1. At a remaining power level less than 50%, the possibility that the switching condition for switching to the idle mode is satisfied in the driving mode switching subunit 44 is low. Thus, the switching probability Pc is set to 0.

As shown in FIG. 13B, the relationship between the switching probability Pc and the available output power, i.e., the battery information Bi, is set in advance through experimentation and/or simulation by assuming that the available output power is used as one of the switching conditions for the driving mode switching subunit 44. In particular, at an available output power of 80% of more, the switching condition for the driving mode switching subunit 44 is satisfied, and the switching probability Pc is set to 1. At an available output power less than 70%, the possibility that the switching condition for switching to the idle mode is satisfied in the driving mode switching subunit 44 is low. Thus, the switching probability Pc is set to 0. The value "70%" is statistically determined on the basis of the probability at which the available output power becomes 70% or less within the predetermined time period A. For example, the available output power may set to be the level at which this probability is 0.5% or less. The switching probability Pc in the range of 70% to 80% is set as a linear function. The purge rate correcting subunit 46 sets the target control value Na of the nitrogen content on the basis of the estimated switching probability Pc and determines the corrected opening POAt of the purge valve 13 on the basis of the target control value Na.

The driving mode switching subunit 44 switches the driving mode from the normal power generation mode to the idle mode if the remaining power level of the secondary battery 4 is greater than or equal to than the judgment remaining power level set in advance as the driving mode switching condition. Alternatively, the driving mode switching subunit 44 may switch the driving mode from the normal power generation mode to the idle mode if the available output power that can be supplied from the secondary battery is greater than or equal to the judgment available output power set in advance as the driving mode switching condition. The purge rate correcting subunit 46 estimates the switching probability Pc on the basis of the remaining power level or the available output power of the secondary battery 4.

According to this system, whether the current status is likely to result in switching of the driving mode can be determined by estimating the switching probability Pc. Thus, the target control value Na of the nitrogen content can be changed according to the estimation of the switching probability Pc, and the nitrogen content can be adequately controlled to suit the respective driving modes. As a result, degradation in fuel consumption during the normal generation mode can be suppressed while improving the fuel efficiency under the idle mode.

In this embodiment, the switching probability Pc is calculated on the basis of the remaining power level of the secondary battery 4, and then the target control value Na of the nitrogen content is calculated. However, the invention is not limited to this arrangement. The relationship between the remaining power level of the secondary battery 4 and the target control value Na may be established by taking the switching probability Pc into account, and the target control value Na may be directly calculated from the remaining power level on the basis of this relationship. In such a case, the purge rate correcting subunit 46 sets the target control value Na to the minimum nitrogen content Nmin if the remaining power level is greater than or equal to the judgment remaining power level and sets the target control value Na to the maximum efficiency nitrogen content Nmax if the remaining power level is less than the judgment remaining power level. This arrangement also has the same effects as the embodiments described above and can decrease the complexity of computation.

In this embodiment, the switching probability Pc is calculated on the basis of the available output power of the secondary battery 4, and then the target control value Na of the nitrogen content is calculated. However, the invention is not limited to this arrangement. The relationship between the available power output of the secondary battery 4 and the target control value Na may be established, and then the target control value Na can be directly calculated from the available output power of the secondary battery 4 on the basis of this relationship. In such a case, the purge rate correcting subunit 46 sets the target control value Na to the minimum nitrogen content Nmin if the available output power is greater than or equal to the judgment available output power. As the available output power decreases from the judgment available output power, the purge rate correcting subunit 46 sets the target control value Na to a value higher than the minimum nitrogen content Nmin but not more than the maximum efficiency nitrogen content Nmax. This arrangement also has the same effects as the embodiments described above and can decrease the complexity of computation.

Figure 14:
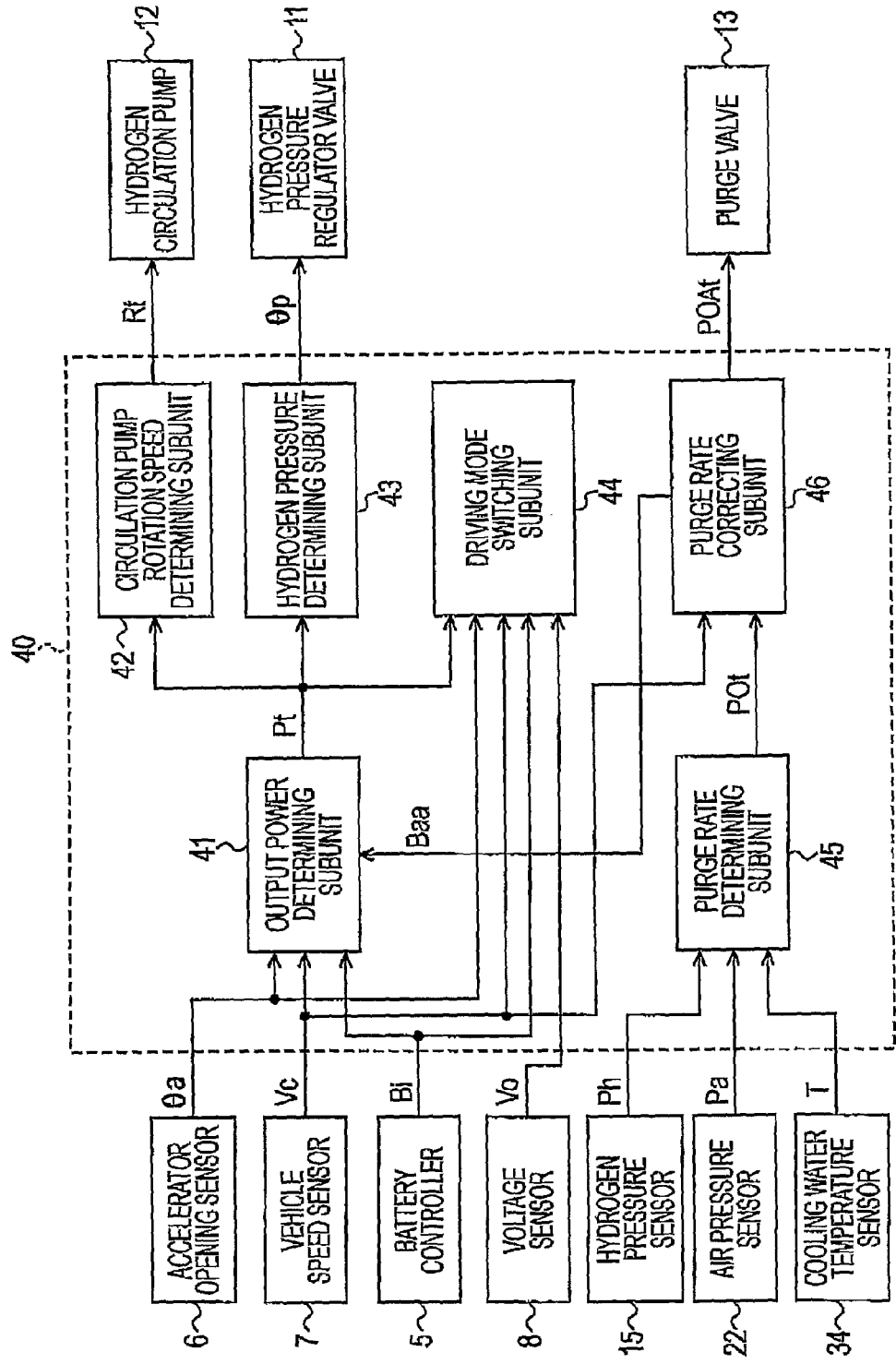
FIG. 14 is a block diagram showing the structure of a control unit in a fuel cell system according to a fifth embodiment.

FIG. 14 is a block diagram showing the structure of a control unit 40 in a fuel cell system according to a fifth embodiment of the invention. The fuel cell system of the fifth embodiment differs from that of the first embodiment in that the control unit 40 (to be more specific, the purge rate correcting subunit 46) designates a corrected power accumulation amount Baa to the output power determining subunit 41. Since the basic system configuration and the correction of the opening of the purge valve 13 are identical to those of the first embodiment, the descriptions thereof are omitted to avoid redundancy. The differences are mainly discussed below.

If the target control value Na of the nitrogen content is changed, the purge rate correcting subunit 46 calculates a reach time Tr on the basis of the new target control value Na. The reach time Tr is the time required for the nitrogen content in the fuel electrode and the hydrogen circulation channel L2 to reach a nitrogen content corresponding to the hydrogen circulation flow rate lower limit Q1 of the new target control value Na from when the driving mode is switched to the idle mode, i.e., from when the target control value Na is decreased to the minimum nitrogen content Nmin. In order to improve the fuel efficiency, the idle mode preferably continues for a long period. Considering that stable power generation is desirable upon returning the driving mode to the normal power generation mode, it is possible to continue the idle mode until the reach time Tr elapses. Thus, the idle mode can be prolonged as much as possible if power can be supplied from the secondary battery 4 during the reach time Tr.

Figure 15:
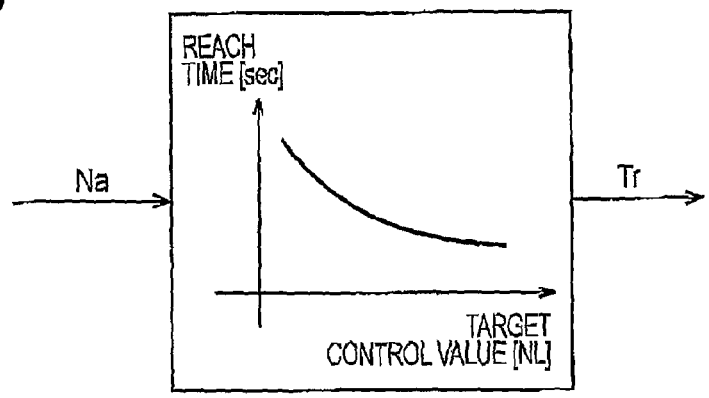
FIG. 15 is a graph showing the relationship between the target control value of the nitrogen content and the reach time.

FIG. 15 is a graph showing the relationship between the target control value Na of the nitrogen content and the reach time Tr. As shown in FIG. 15, the relationship between the reach time Tr and the target control value Na is set in advance through experimentation and/or simulation. For example, the reach time Tr decreases with an increase in the target control value Na. Once the reach time Tr corresponding to the target control value Na is determined, the purge rate correcting subunit 46 calculates the power (hereinafter referred to as "the output power") that needs to be generated in the fuel cell stack 1. Then the amount of the remaining power level of the secondary battery 4 that is necessary is calculated on the basis of the output power and the reach time Tr, and the result is output as the corrected power accumulation amount Baa to the output power determining subunit 41. In the output power determining subunit 41, the target output power Pt is re-calculated, the driving mode is switched to the idle mode, and then an excess amount of power to be supplied corresponding to the reach time is generated.

In this embodiment, when the target control value Na of the nitrogen content is changed to a value smaller than the current value, the purge rate correcting subunit 46 commands the output power determining subunit 41 to generate additional power to be stored in the secondary battery 4. According to this system, additional power can be stored in the secondary battery 4 by taking into account the duration of the idle mode. Thus, during the idle mode, power can be supplied from the secondary battery 4 that stores additional power, and thus the duration of the idle mode can be prolonged.

Figure 16:
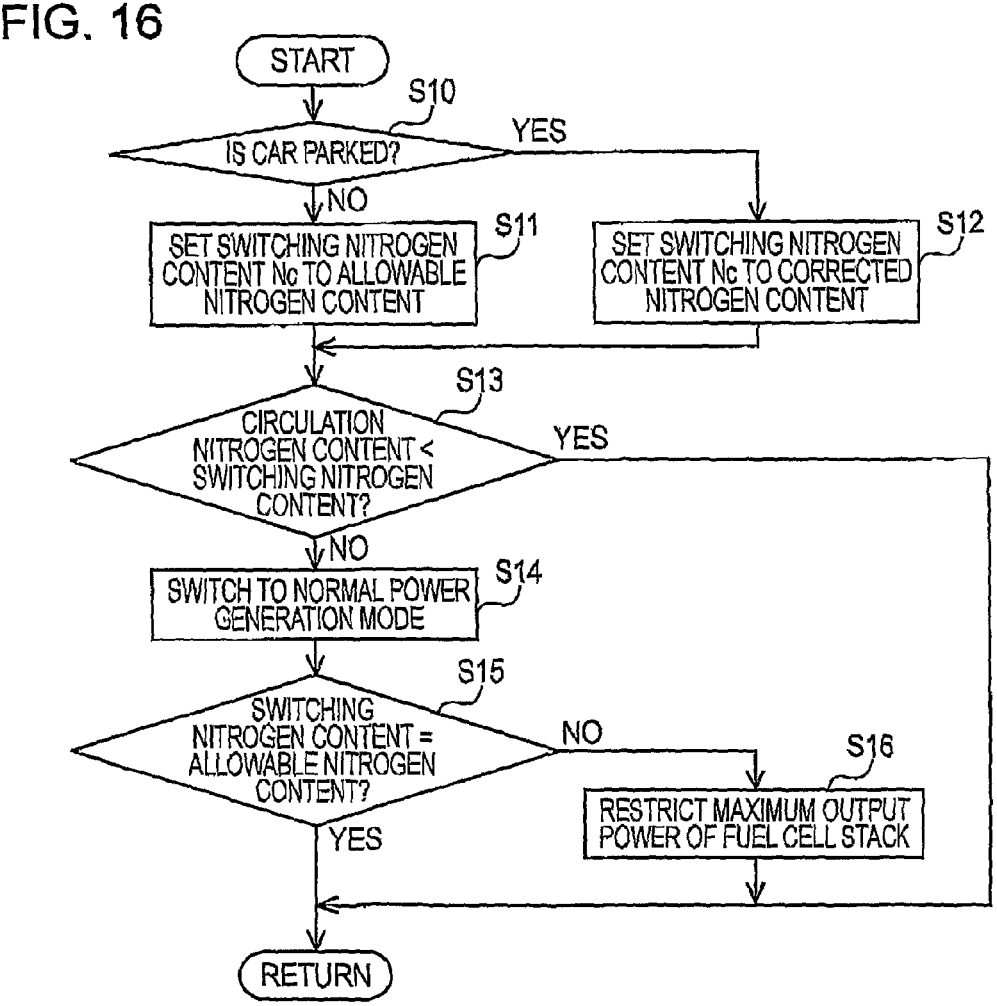
FIG. 16 is a flowchart showing the steps of switching the driving mode in a fuel cell system according to a sixth embodiment.

FIG. 16 is a flowchart showing the steps of switching the driving mode in a fuel cell system according to a sixth embodiment. The fuel cell system of the sixth embodiment differs from that of the first embodiment in the determination for switching the driving mode by the control unit 40 (to be more specific, the driving mode switching subunit 44). Since the basic system configuration and the correction of the opening of the purge valve 13 are identical to those of the first embodiment, the descriptions thereof are omitted to avoid redundancy. The differences are discussed below.

In this embodiment, when the driving mode is in the idle mode, the driving mode switching subunit 44 performs a switching determination process that determines whether the driving mode should be switched from the idle mode to the normal mode. As described in the first embodiment, when the driving mode is in the idle mode but the conditions for switching to the idle mode are no longer satisfied, the driving mode switching subunit 44 switches the driving mode to normal power generation mode. During this process, the switching determination process described in this embodiment is performed. The flowchart shown in FIG. 16 is called at predetermined intervals and is executed by the driving mode switching subunit 44.

In S10, whether a car is in park or not is determined. This determination can be made by acquiring information from a navigation system (not shown in the drawing). Alternatively, the determination may be made by detecting the operation of the barking brake and determining whether the parking brake is used or not. If NO is determined in S10, i.e., if the car is not parked, the process proceeds to S11. If YES is determined in S10, i.e., if the car is parked in a parking lot, the process proceeds to S12.

Figure 17:
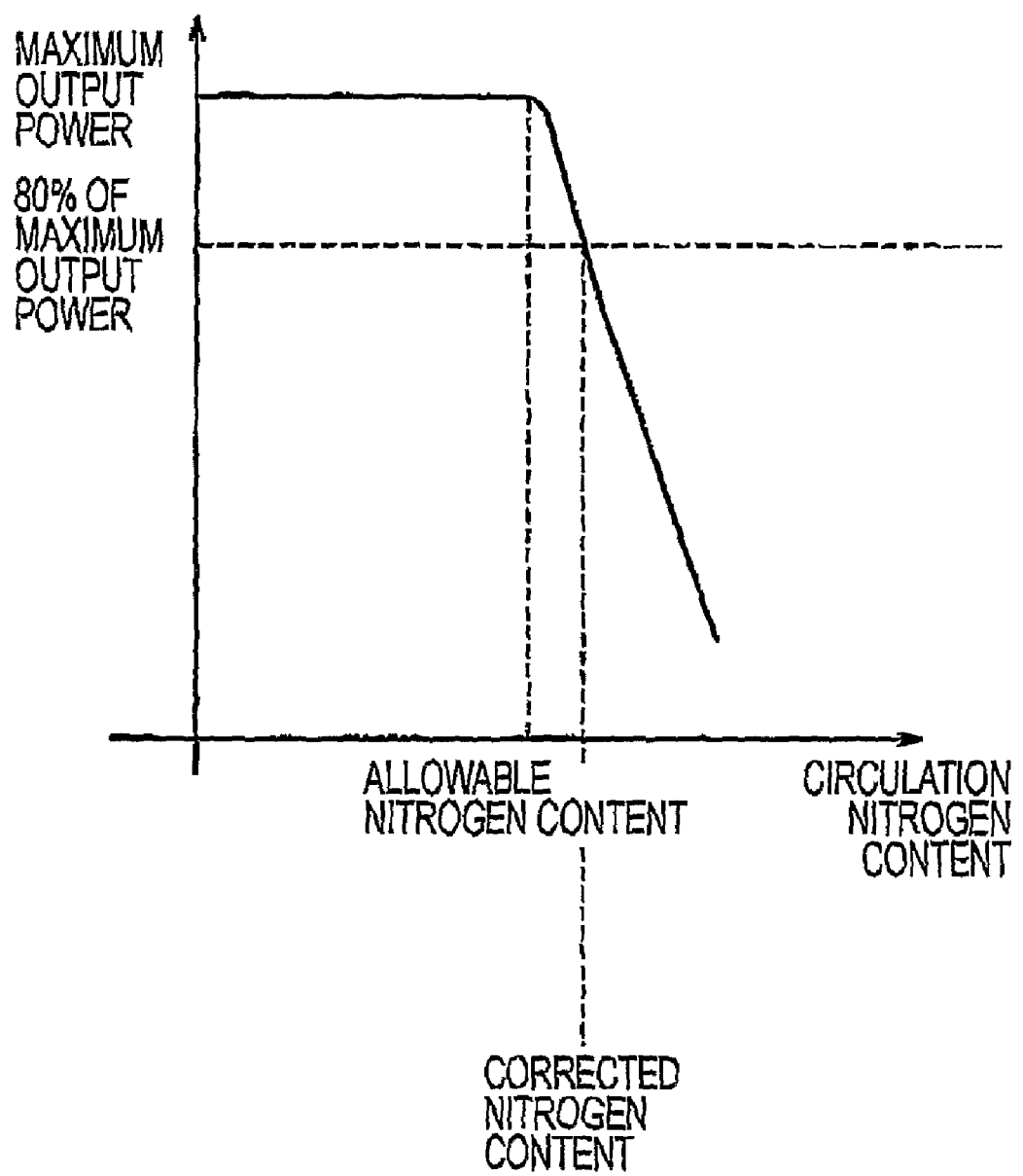
FIG. 17 is a graph showing the corrected nitrogen content.

In S11, a switching nitrogen content Nc is set to be the allowable nitrogen content. The switching nitrogen content Nc is a parameter that defines the lower limit of the nitrogen content in the fuel electrode and the hydrogen circulation channel L2 (hereinafter referred to as "circulation nitrogen content") required in order to switch the driving mode from the idle mode to the normal power generation mode. The allowable nitrogen content is calculated as follows. First, the rotation speed of the hydrogen circulation pump 12 is set to a maximum value, and the operation pressure of the fuel cell stack 1 is set to a maximum value. Under these conditions, the maximum output power the fuel cell stack 1 can generate stably at a predetermined circulation nitrogen content is calculated. Then the circulation nitrogen content is changed, and the calculation is repeated. As a result, as shown in FIG. 17, the upper limit value of the nitrogen content at which the maximum power output can be yielded from the fuel cell stack 1 is determined, and this value is set as the allowable nitrogen content.

In S12, the switching nitrogen content Nc is set to be the corrected nitrogen content. The corrected nitrogen content is, as shown in FIG. 17, the circulation nitrogen content, relative to the maximum output power, at which the power output is 80% of the maximum power output calculated in S11.

In S13, it is determined whether the circulation nitrogen content is smaller than the switching nitrogen content Nc, i.e., the switching condition. The circulation nitrogen content can be measured by installing an instrument for measuring the amount of nitrogen in the fuel electrode and the hydrogen circulation channel L2 or by calculating the amount of nitrogen in real time. If YES is determined in S13, i.e., if the circulation nitrogen content is smaller than the switching nitrogen content Nc, the processes described below are skipped, and the routine is exited. If NO is determined in S13, i.e., if the circulation nitrogen content is equal to or more than the switching nitrogen content Nc, the process proceeds to S14, and the driving mode is switched from the idle mode to the normal power generation mode.

In S15, whether the value set to be the switching nitrogen content Nc is the allowable nitrogen content or not is determined. If YES is determined in S15, i.e., if the allowable nitrogen content is set as the switching nitrogen content Nc, the routine is exited. If NO is determined in S15, i.e., if the corrected nitrogen content is set to be the switching nitrogen content Nc, the process proceeds to S16.

In S16, the command to limit the maximum power output of the fuel cell stack 1 to 80% is output to the output power determining subunit 41. As a result, the target output power is restricted in the output power determining subunit 41 to 80% or less of the maximum power output.

In this embodiment, when the current driving mode is the idle mode and the nitrogen content in the hydrogen circulation channel L2 and fuel electrode is greater than or equal to than the switching nitrogen content Nc, the driving mode switching subunit 44 switches the driving mode from the idle mode to the normal power generation mode. The switching nitrogen content Nc is set to a maximum nitrogen content (allowable nitrogen content) at which power can be continuously and stably generated by fully operating the fuel cell stack 1 provided that the movable object is not stopped. In the case where the vehicle is stopped, the switching nitrogen content Nc is set to be a value larger than the allowable nitrogen content.

As a result, if it is estimated that no high power is required from the fuel cell stack 1, as in the case where the vehicle is stopped, the switching nitrogen content Nc is set at a level larger than the allowable nitrogen content. The idle mode can be prolonged, and the fuel efficiency can be improved.

In this embodiment, if the switching nitrogen content Nc is set to be the corrected nitrogen content, the driving mode switching subunit 44 commands the output power determining subunit 41 to restrict the target output power. Failure to stably generate power in the fuel cell stack 1 caused by an excessively large nitrogen content in the fuel electrode and the hydrogen circulation channel L2, and deficiency of the flow rate of hydrogen supplied to the fuel cell stack 1 can be suppressed. Thus, it is possible to suppress degradation in moving performance of the movable object.

In this embodiment, information from the navigation system is supplied in order to determine whether the vehicle is being parked in a parking lot or not and to determine whether the vehicle will continue to stop. Traffic information may also be supplied in addition to the information regarding parking lots in making the determination.

In this embodiment, at a nitrogen content exceeding the allowable nitrogen content, the maximum output power is limited to 80%. Alternatively, any other appropriate percentage may be selected, and the percentage may be changed depending on the remaining power level of the secondary battery 4.

Accordingly, the above-described embodiments have been described in order to allow understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A fuel cell system comprising:
a fuel cell configured to generate power by electrochemical reaction between a fuel gas supplied to a fuel electrode and an oxidizer gas supplied to an oxidizer electrode;
a fuel gas supply channel through which the fuel gas is supplied to the fuel electrode;
a circulation channel through which a gas discharged from the fuel electrode of the fuel cell is fed to the fuel gas supply channel;
a circulator unit configured to circulate the fuel gas, the circulator unit being provided in the circulation channel;
a discharge channel through which a gas flowing in the circulation channel is discharged;
a discharge amount-adjusting unit configured to adjust an amount of an impurity to be discharged through the discharge channel;
a mode switching unit programmed to switch a driving mode between a normal power generation mode in which power required by the system is supplied through power generation in the fuel cell and an idle mode in which power generation in the fuel cell is stopped and power required by the system is supplied from a power storing unit;
a mode switching probability unit programmed to determine a switching probability based on a switching condition;
a setting unit programmed to variably set a target control value of an impurity content in at least one of the circulation channel and the fuel electrode based on the switching probability; and
a controller programmed to control the discharge amount-adjusting unit based on the target control value.

2. The fuel cell system according to claim 1 wherein:
the setting unit is programmed to variably set the target control value within a range of a minimum impurity content and a maximum efficiency impurity content greater than the minimum impurity content;
the minimum impurity content is an impurity content in at least one of the circulation channel and the fuel electrode at which a flow rate of the fuel gas circulated by the circulator unit is maximized; and
the maximum efficiency impurity content is an impurity content in at least one of the circulation channel and the fuel electrode at which a sum of power consumed by the circulator unit and power the fuel cell could generate using the fuel gas discharged together with the impurity through the discharge channel is minimized.

3. The fuel cell system according to claim 2 wherein:
the mode switching unit is programmed to switch the driving mode from the normal power generation mode to the idle mode when a speed of a movable object driven by power supplied from the system is not more than a judgment speed; and
wherein the switching condition is the speed of the movable object and the setting unit is programmed to set the target control value to the minimum impurity content if the speed of the movable object is not more than the judgment speed, and to set the target control value to be larger than the minimum impurity content but not more than the maximum efficiency impurity content when the speed of the moveable object increases from the judgment speed.

4. The fuel cell system according to claim 2 wherein:
the mode switching unit is programmed to switch the driving mode from the normal power generation mode to the idle mode if a relative distance between a movable object driven by power supplied from the system and a subject present in the travelling direction of the movable object is not more than a judgment distance; and
wherein the switching condition is the relative distance and the setting unit is programmed to set the target control value to the minimum impurity content if the relative distance is not more than the judgment distance, and to set the target control value to be larger than the minimum impurity content but not more than the maximum efficiency impurity content when the relative distance increases from the judgment distance.

5. The fuel cell system according to claim 2 wherein:
the mode switching unit is programmed to switch the driving mode from the normal power generation mode to the idle mode if an acceleration request value requested by an operator to a movable object driven by power supplied from the system is not more than a judgment acceleration request value; and
wherein the switching condition is the acceleration request value and the setting unit is programmed to set the target control value to the minimum impurity content if the acceleration request value is not more than the judgment acceleration request value, and to set the target control value to be larger than the minimum impurity content but not more than the maximum efficiency impurity content when the acceleration request value increases from the judgment acceleration request value.

6. The fuel cell system according to claim 2 wherein:
the mode switching unit is programmed to switch the driving mode from the normal power generation mode to the idle mode if an operator sends a deceleration request to a movable object driven by power supplied from the system; and
wherein the switching condition is the deceleration request and the setting unit is programmed to set the target control value to the minimum impurity content if there is the deceleration request and to set the target control value to the maximum efficiency impurity content if there is no deceleration request.

7. The fuel cell system according to claim 2 wherein:
the mode switching unit is programmed to switch the driving mode from the normal power generation mode to the idle mode if a remaining power level of the power storing unit is greater than or equal to than a judgment remaining power level; and
wherein the switching condition is the remaining power level and the setting unit is programmed to set the target control value to the minimum impurity content if the remaining power level is greater than or equal to than the judgment remaining power level and to set the target control value to the maximum efficiency impurity content if the remaining power level is less than the judgment remaining power level.

8. The fuel cell system according to claim 2 wherein:
the mode switching unit is programmed to switch the driving mode from the normal power generation mode to the idle mode if an available output power that can be supplied from the power storing unit is greater than or equal to than a judgment available output power, which is a driving mode switching condition set in advance; and
wherein the switching condition is the available output power and the setting unit is programmed to set the target control value to the minimum impurity content if the available output power is greater than or equal to than the judgment available output power, and to set the target control value to be larger than the minimum impurity content but not larger than the maximum efficiency impurity content as the available power decreases from the judgment available output power.

9. The fuel cell system according to claim 1 wherein:
the setting unit is programmed to set the target control value to a minimum impurity content if the switching probability is a maximum value and to set the target control value to a maximum efficiency impurity content if the switching probability is a minimum value, and to set the target control value to be larger than the minimum impurity content but not larger than the maximum efficiency impurity content as the switching probability increases from the minimum value.

10. The fuel cell system according to claim 1, further comprising:
an output power determining unit programmed to determine a target output power to be generated in the fuel cell, wherein:
when the target control value is changed to a value smaller than a current value, the setting unit commands the output power determining unit to cause the fuel cell to generate additional power to be stored in the power storing unit.

11. The fuel cell system according to claim 1 wherein:
the mode switching unit is programmed to switch the driving mode from the idle mode to normal power generation mode if a current driving mode is the idle mode and the impurity content in at least one of the circulation channel and the fuel electrode is greater than or equal to a switching impurity content; and
when a movable object driven by power generated from the system is moving and a maximum output power is generated in the fuel cell, the switching impurity content is set to be an allowable impurity content equal to a maximum value of the impurity content at which power can be continuously and stably generated in the fuel cell by putting the circulation unit under a maximum operation state; and
when the movable object is at stop, the switching impurity content is set to be a corrected impurity content larger than the maximum value of the impurity content.

12. The fuel cell system according to claim 11, further comprising:
an output power determining unit programmed to determine a target output power to be generated in the fuel cell;
wherein, when the switching impurity content is set to be the corrected impurity content, the mode switching unit commands the output power determining unit to restrict the target output power.

13. The fuel cell system according to claim 1, wherein the setting unit is programmed to decrease the target control value of an impurity content according to an increase in the switching probability from the driving mode to the idle mode.

14. A method for controlling a fuel cell system, comprising:
determining a switching a probability of switching between a normal power generation mode in which power required by the system is supplied from a fuel cell configured to generate power by reaction between a fuel gas supplied to a fuel electrode and an oxidizer gas supplied to an oxidizer electrode and an idle mode in which power generation in the fuel cell is stopped and power required by the system is supplied from a power storing unit based on a switching condition;
variably setting a target control value of an impurity content in the fuel electrode of the fuel cell and a circulation channel through which a gas discharged from the fuel electrode is circulated to a fuel gas feed side based on the switching probability; and
adjusting an amount of an impurity discharged from the circulation channel based on the target control value.

15. The method according to claim 14, wherein variably setting the target control value of an impurity content further comprises setting the target control according to an increase in the switching probability from the driving mode to the idle mode.

* * * * *